US009605791B2

(12) United States Patent
Howlett et al.

(10) Patent No.: US 9,605,791 B2
(45) Date of Patent: Mar. 28, 2017

(54) POST MOUNTING SYSTEM AND DEVICE

(71) Applicant: Onesteel Wire Pty Limited, Sydney (AU)

(72) Inventors: Warren John Howlett, Northam (AU); Mark White, Sydney (AU); Brad Taylor, Sydney (AU)

(73) Assignee: Onesteel Wire Pty Limited, Sydney, NSW (AU)

( * ) Notice: Subject to any disclaimer, the term of this patent is extended or adjusted under 35 U.S.C. 154(b) by 44 days.

(21) Appl. No.: 14/222,199

(22) Filed: Mar. 21, 2014

(65) Prior Publication Data

US 2014/0339378 A1     Nov. 20, 2014

Related U.S. Application Data

(63) Continuation of application No. 13/391,506, filed as application No. PCT/AU2010/001083 on Aug. 23, 2010, now abandoned.

(30) Foreign Application Priority Data

Aug. 21, 2009 (AU) ................................ 2009903959
Sep. 24, 2009 (AU) ................................ 2009904631

(51) Int. Cl.
    *F16M 11/04*       (2006.01)
    *E04H 17/10*       (2006.01)
                 (Continued)

(52) U.S. Cl.
    CPC ............. *F16M 11/04* (2013.01); *A01G 17/14* (2013.01); *E04H 17/10* (2013.01); *E04H 17/20* (2013.01);
                 (Continued)

(58) Field of Classification Search
    CPC ......... F16M 11/04; E04H 17/24; E04H 17/10; E04H 17/20; G09F 15/005; G09F 2007/1804; A01G 17/14
    See application file for complete search history.

(56) References Cited

U.S. PATENT DOCUMENTS 1,859,688 A     5/1932    Wilson
2,618,685 A    11/1952    Lewis
                 (Continued)

FOREIGN PATENT DOCUMENTS

AU        GB 2286839 A  *  8/1995  ............. A01K 3/005
AU        CA 2501083 A1 *  4/2003  ............... A01K 3/00
                (Continued)

*Primary Examiner* — Jeanette E Chapman
(74) *Attorney, Agent, or Firm* — The Webb Law Firm

(57) ABSTRACT

A post mounting system includes a post and at least one device for mounting to the post. The post includes a first elongate flange and at least one other elongate flange projecting from a proximal edge of the first flange. A portion of the first flange is deformed to facilitate mounting of the device. The device is located at a given position along the first flange. Upon being located in the given position, the device interacts with the deformed portion to resist lateral movement away from the first flange. The device can include a body and projections that define a recess. Remote ends of the projections are spaced from each other by a distance that is less than a lateral width of the deformed portion. The device can be positioned onto the post and receive the deformed portion in the recess to enable mounting of the device.

14 Claims, 20 Drawing Sheets

(51) Int. Cl.
*E04H 17/20* (2006.01)
*A01G 17/14* (2006.01)
*G09F 15/00* (2006.01)
*E04H 17/24* (2006.01)
*G09F 7/18* (2006.01)

(52) U.S. Cl.
CPC ........... *E04H 17/24* (2013.01); *G09F 15/005* (2013.01); *G09F 2007/1804* (2013.01)

(56) References Cited

U.S. PATENT DOCUMENTS

| | | | | |
|---|---|---|---|---|
| 3,820,758 | A * | 6/1974 | berg, Jr. et al. | A01K 3/005 174/163 F |
| 4,077,611 | A * | 3/1978 | Wilson | A01K 3/005 174/163 F |
| 4,642,940 | A * | 2/1987 | Ettema | A01G 17/14 47/44 |
| 5,046,705 | A * | 9/1991 | Williams | E04H 17/08 256/36 |
| 5,338,007 | A | 8/1994 | Hinton | |
| 5,547,322 | A * | 8/1996 | Lilja | A01K 3/00 248/73 |
| 6,872,892 | B1 * | 3/2005 | Burdick | H01B 17/145 174/158 F |
| 7,960,654 | B2 | 6/2011 | Ritchie | |

FOREIGN PATENT DOCUMENTS

| | | | | |
|---|---|---|---|---|
| CA | 2137335 | A * | 6/1994 | |
| FR | 2722820 | A1 * | 1/1996 | ............ E04H 17/06 |
| GB | 988165 | | 4/1965 | |
| GB | 1323388 | | 7/1973 | |
| GB | 2029870 | | 3/1980 | |
| GB | 2187771 | A * | 9/1987 | ............ A01K 3/005 |
| WO | 00/19043 | A1 | 4/2000 | |

* cited by examiner

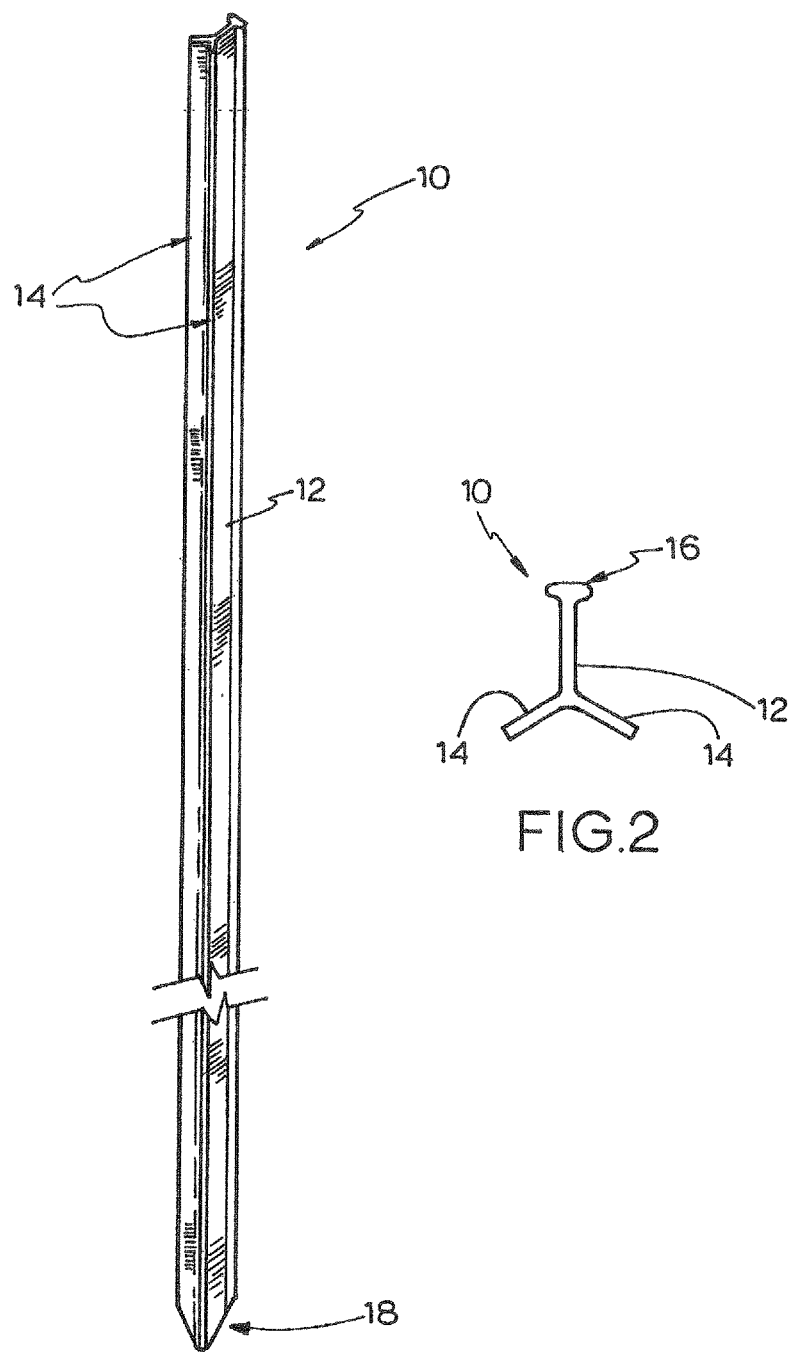

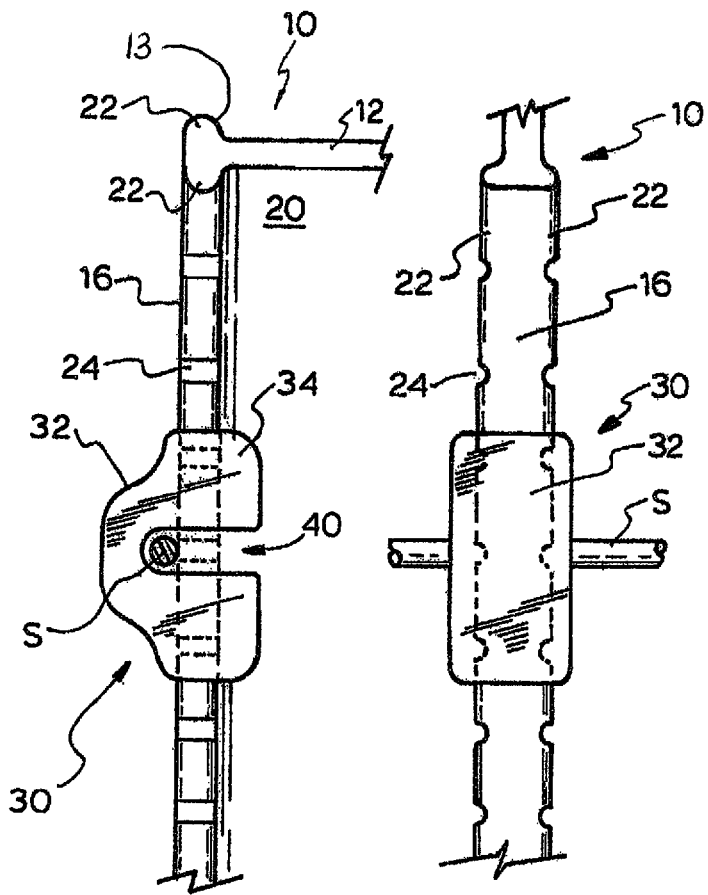
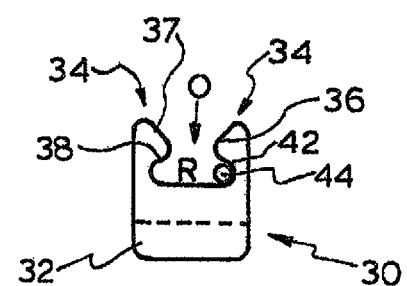
FIG.7A  FIG.7B
FIG.7C

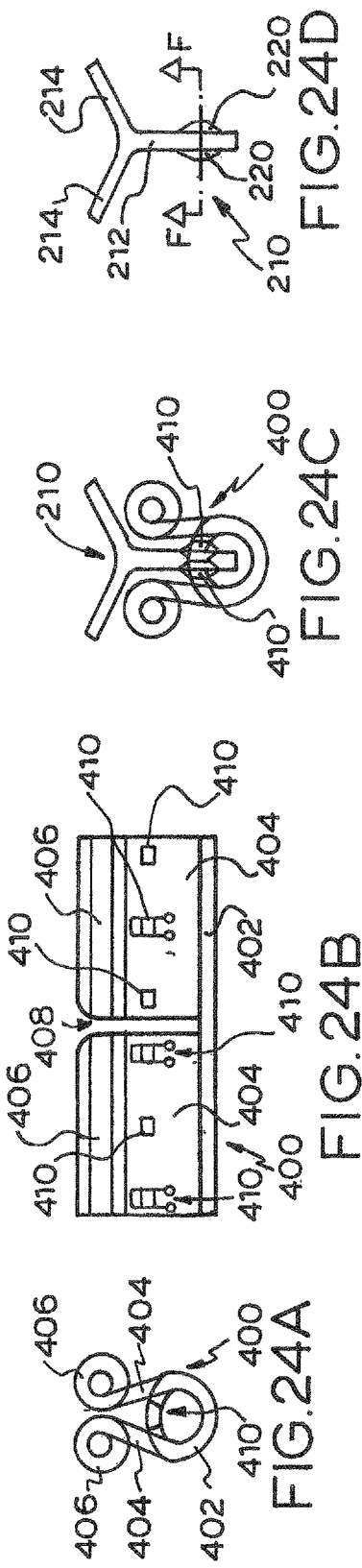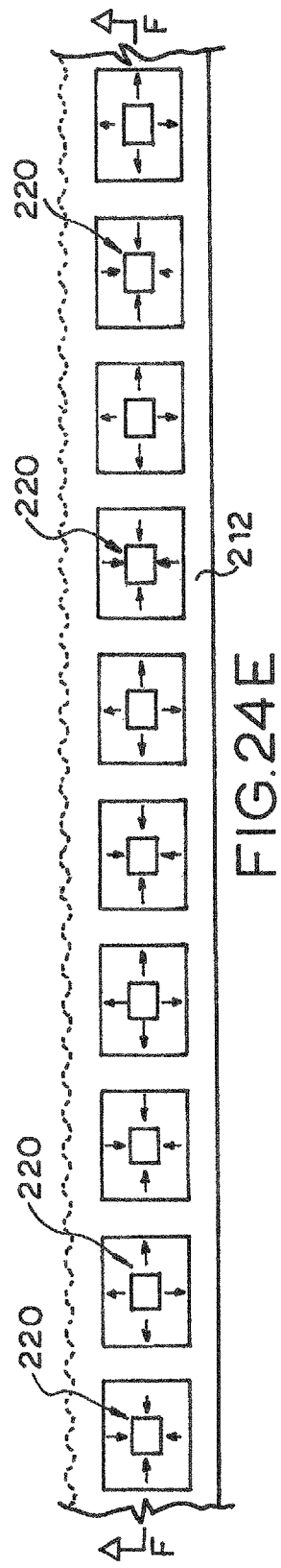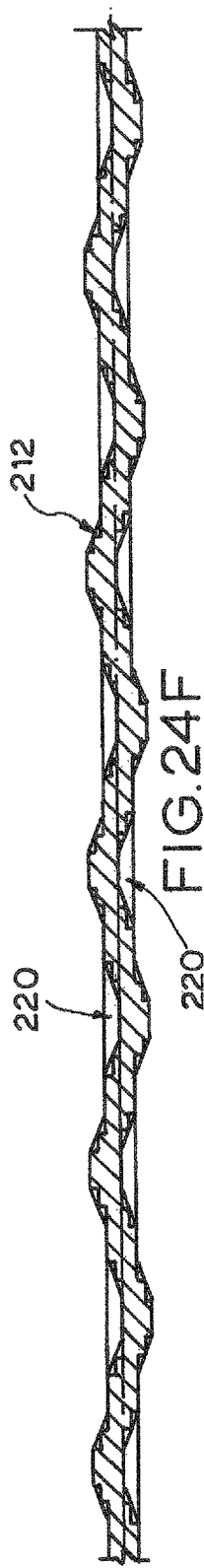

POST MOUNTING SYSTEM AND DEVICE

REFERENCE TO RELATED APPLICATION

This application is a continuation of U.S. application Ser. No. 13/391,506 filed Feb. 21, 2102 which is the United States national phase of International Application No. PCT/AU2010/001083 filed Aug. 23, 2010, which claims priority to Australian Patent Application No. AU 2009903959 filed Aug. 21, 2009 and Australian Patent Application No. AU 2009904631 filed Sep. 24, 2009. The disclosure of each of these documents is hereby incorporated in their entirety by reference.

TECHNICAL FIELD

A post mounting system and device are disclosed. The system and device can be employed in applications such as fencing, demarcation, signage, retention, barricades, etc. The post can be deformed to enable mounting of the device thereto, and the device when mounted to the post can enable various items to be secured at the post (e.g. such as fence wire). The post can take the form of a picket (e.g. that comprises a "stalk" flange and one or more other elongate flanges projecting from the stalk). However, the post and the system are to be broadly interpreted, in that the post can form a rail, a cross-member, a strut, a stay, a channel, etc in the system.

BACKGROUND ART

Posts used in applications such as fencing, demarcation, signage etc are usually formed from steel, though in some applications (e.g. electric fencing) it is known to mould such posts from a plastic material.

Steel fence posts have been known for many years that are roll-formed to have a Y-shaped or T-shaped profile (i.e. in end view). The post may take the form of a picket and in this case may be provided (e.g. cut) with a pointed end to facilitate post driving into the earth.

Such steel fence posts are usually provided with a series of spaced holes in a flange thereof (i.e. in the so-called "stalk", "stem" or "base web") to enable strands of fencing wire to be secured to the post, usually by tying each wire strand to the post with a separate short length of wire tie, or by employing a wire "clip". However, the wire can also be threaded directly through such holes. These holes are typically punched into an already roll-formed post in a separate step.

In addition (or as an alternative) to the series of holes, the posts can be provided with a series of spaced passages that are usually machined to project right into the stalk from a distal edge thereof. These passages enable a strand of fencing wire to be moved into and retained in the passage, thereby securing the wire directly to the post. Again, these passages are typically machined into an already roll-formed post in a separate step.

It is known that such holes and passages in the stalk decrease the bend strength of a post, and can promote points/regions of post failure as well as points/regions for corrosion of fencing wire (e.g. when the wire is threaded through the holes or located in the passages). The holes and passages can also provide sharp catch points.

In addition, the existing systems for attaching wire to a fence post present a high degree of manual labour, and some of the ties employed also require the services of a skilled fencer.

U.S. Pat. No. 1,637,645 discloses a traditional wire tieing system for a T-post, but also discloses a ground anchor plate which can be located on a base web of the T-post. The anchor plate extends to the cross web of the T-post, and has a series of holes that receive teeth of the cross web therein. To secure the ground anchor plate to the base web, the sides of the plate must be hammered in with a tool.

U.S. Pat. No. 1,814,228 and U.S. Pat. No. 1,859,688 each disclose wire-type clips/clamps for securing a wire strand to a T-post. The clips/clamps are mounted at the stem of the T-post, but then extend to the extremities of the flanges of the T-post to secure the wire strand at those flanges.

GB 988,165 discloses a type of Y-post having a flange that is located to project on either side of a stem of the Y-post. A fixing member for securing a wire strand to the post has margins that need to be bent around the flange to secure fixing member thereto.

In a similar manner, FR 2,722,820 discloses a hollow post having a flange that is located to project on either side of a stem that projects out from the hollow post. A fastener has ends that can be bent around the flange. The present disclosure is not concerned with tube- or hollow-type posts.

WO 2005/090714 discloses a tubular post having a lobe to which a clip for a wire strand can be secured, with a screw preventing the clip from sliding along the lobe. Again, the present disclosure is not concerned with tube-type posts.

U.S. Pat. No. 4,642,940 discloses a two-part clamp for securing wires strands on either side of a T-post. A first clamp part clips around the stem and lateral flanges of the T-post, and a second clamp part (which also supports the wire strands) secures around first clamp part.

The above references to the background art do not constitute an admission that the art forms a part of the common general knowledge of a person of ordinary skill in the art. The above references are also not intended to limit the application of the system and device disclosed herein.

SUMMARY OF THE DISCLOSURE

In a first aspect there is disclosed a post mounting system comprising a post and at least one device for mounting to the post. In the system the post is of a type that comprises a first elongate flange and at least two other elongate projecting flanges that project from a proximal edge of the first flange (i.e. the system does not relate to tube- or hollow-type posts).

The first flange defines a stalk of the post and, in this regard, the post may take the form of a Y-post or a T-post. However, it should be noted in the system that the post is not limited to a Y-post or a T-post.

In accordance with the system of the first aspect, a portion of the stalk is deformed, relative to a remainder of the stalk, to facilitate mounting of the device thereto. In further accordance with the system of the first aspect, the device is adapted for location at a given position along the stalk and such that, immediately upon being located in the given position, the device engages with the deformed portion to resist lateral movement away from the stalk.

The adaptation of the device that enables it to engage with the deformed portion to resist lateral movement away from the stalk immediately upon being located (i.e. as soon as it is located) in the given position, facilitates a rapid and simple device-to-post mounting. It also allows for mechanisation of the device-to-post mounting operation (e.g. where the device is mounted to the stalk in a single action by an automatic gun-type mechanism).

As will be explained hereafter, the mounting of the device to the post can be by way of snap-, spring-, or push-fitting onto the flange, or by sliding it into position. In each case, the device and post are configured such that, as soon as the device is located in the given position, it is able to "resist lateral movement away from the flange".

This is to be contrasted with the prior art systems for Y- and T-posts which, to prevent lateral movement of the device away from the post, require an additional device actuation step (e.g. clip deformation, additional clamping, etc). Alternatively, the prior art systems for Y- and T-posts require the device to also be secured to the other flanges of the post to resist lateral movement. This results in more complex and cumbersome arrangements.

In one embodiment, the deformed portion of the stalk can be defined: (a) along a distal edge of the stalk, or (b) in sides of the stalk, or in both the distal edge and sides of the stalk. Usually the stalk is deformed for a substantial part (or all) of its length.

Usually the proximal edge of the stalk can define a longitudinal axis of the post, and the two elongate flanges can project from and along the length of the stalk proximal edge (for example, when the post is provided as a picket with either a Y-shaped or T-shaped profile). The stalk may also be referred to as a stem or base web of the post.

In case (a) (i.e. deformed portion of the stalk at the distal edge thereof), the given position can be located along the distal edge, with the deformed portion being defined as an enlargement along the distal edge relative to a remainder of the stalk. The device can then interact with the enlargement immediately upon being located in the given position to resist lateral movement away from the stalk.

In case (a), the device can be mounted to the post by:
(i) snap-fitting it to the post, whereby the device is forced onto the distal edge to deform around and snap onto the enlargement.
(ii) spring-fitting it to the post, whereby the device is forced onto the distal edge such that part(s) of the device are biased out and then spring back once past the enlargement.
(iii) slide-mounting it to the post, whereby the device is slid onto the enlargement and to the given position via an end of the stalk, and the device interferes with the enlargement during sliding into the given position to resist lateral movement away from the stalk
(iv) swaging it to the post at the given position, by sliding the device onto the enlargement via an end of the stalk to the given position, and then swaging the device to the post. During sliding into the given position, the device interferes with the enlargement to resist lateral movement away from the stalk.

In one embodiment of (a) the enlargement can comprise one or more protrusions that extend from and along the distal edge. For example, two protrusions can be defined along opposite sides of the distal edge by:
(i) first and second elongate lugs that project laterally from the stalk at the distal edge.
(ii) a relatively thicker section of the stalk that extends along the distal edge and that defines first and second lateral faces on the protrusions. These first and second faces can be located laterally further from a centerline of the stalk than adjacent faces of a remainder of the stalk.

In this embodiment, when the stalk is viewed in end profile:
in the case of (i), each of the first and second elongate lugs can have a thickness that is less than the width of the distal edge. Such an arrangement may require less post material.
in the case of (ii), the first and second faces can be spaced from each other by a dimension that is less than a depth of the thicker section of the flange. Such an arrangement may be easier to roll form.

In this embodiment, in the case of (i) or (ii), a plurality of discrete indentations can be defined in the enlargement along the distal edge. Then, a given indentation can be engaged by a respective device when located at the given position to secure the device against sliding movement along the edge. For example, in the case of:
(i) the indentations can comprise a series of notches located along one or both sides of the first and second elongate lugs. Each device can include at least one for receipt in a given indentation when the device is located at the given position.
(ii) shoulders can extend between the first and second faces and a remainder of the stalk. The indentations can comprise a series of rebates that are located along one or both of the shoulders. A surface can be defined within the device that corresponds to and is able to be located in a given rebate. In this case, the rebates may define a castellated profile along one or both of the shoulders. Alternatively, the rebates can be defined as a series of curved or V-shaped indentations along one of both of the shoulders. A correspondingly shaped surface can then be defined within the device.

In the case of (ii) the device surface may be caused to be drawn into inter-engagement with a given rebate in use:
through an action on the device of a component that is supported by the device (e.g. the weight of a wire strand acting on the device); or
by one or more spring clips that form a part of the device (i.e. the spring clips can urge the device surface into the rebate).

In an alternative arrangement for securing the device at the given position against sliding movement along the stalk, the device can engage the stalk via:
(a) one or more grub screws in the device that can be advanced against the stalk;
(b) a wedge element in the device that can be moved in the device to act against the stalk.

When the deformed portion of the stalk is defined in sides of the stalk, the sides of the flange may be indented generally along a centerline of the flange. In this case, the indented direction of adjacent indentations may alternate along the length of the flange. This alternating series of indentations can be better suited for engagement by a device.

For example, the device can comprise two projections that are biased together (e.g. in a spring-like arrangement). The device may then be adapted to be spring-fitted to the stalk by mounting the device onto the flange such that the projections are caused (e.g. by a suitable tool) to be biased out and to sit on opposite respective sides of the flange. The projections may each comprise one or more inward protrusions that can each be arranged therealong to locate in a respective indentation, to secure the device against sliding movement along the stalk.

In the various embodiments outlined above, the device can be configured for securing a strand, or for securing a retainer thereat. Thus, when the device is secured to the post the strand can be secured with respect to the post, or the retainer can be employed to retain another component (e.g. an article such as a sign etc) between itself and the device. Thus, the retainer and the component can be secured with respect to the post.

When deployed (e.g. in fencing, signage, etc), the system can make use of a number of posts, and a plurality of devices for mounting in a spaced manner along any number of the posts.

To manufacture each post, a hot roll-forming procedure can be employed. In this procedure, the deformation of the stalk (i.e. that facilitates mounting of the device thereto) may be continuously formed during the hot roll-forming procedure (i.e. the flange can be deformed in one or more final passes of the hot roll-forming procedure). Alternatively, the flange may be deformed in a cold-forming procedure that occurs subsequent to the hot roll-forming procedure.

Usually, when hot roll-formed, the post is of steel, or a steel alloy. The device can be cast of the steel or alloy (e.g. when it is to be slide-mounted onto the post), or it can be injection moulded from plastic (e.g. when it is to be snap-fitted onto the post).

For specialist applications (e.g. electric fencing) the post can be moulded of plastic (e.g. by injection or extrusion moulding). A plastic (insulator-type) device would usually also be employed for electric fencing applications.

In a second aspect there is disclosed a device that is configured for mounting to a post along from an end of the post. The post is of a type that comprises an elongate flange, with a portion of the flange being deformed relative to a remainder of the flange to facilitate mounting of the device thereto. For example, at least one other elongate projecting flange can project from a proximal edge of the stalk. In this regard, the post may take the form of a Y-post or a T-post. However, it should be noted that the post to which the device can be mounted is not limited to a Y-post or a T-post.

The device comprises a body and projections that extend from the body to define a recess therebetween. Remote ends of the projections are spaced from each other by a distance that is less than a lateral width (i.e. the in-use side-to-side distance) of the deformed portion of the flange prior to mounting the device to the post.

In accordance with the second aspect the device is configured such that it is able to be mounted to the post along from its end to be retained against sliding along the flange. When so mounted the deformed portion of the flange is received in the recess and the projections interact with the deformed portion to resist lateral movement away from the flange.

Again, such a device can be simply and rapidly mounted to the post. Further, immediately upon mounting, the device can resist lateral movement from the post. The device may also be manufactured as a single or unitary item (e.g. moulded from plastic or cast from an alloy).

In one form, the device can be configured to be pushed onto the post to clip onto the flange (e.g. in a snap-fit). Alternatively, in another form, the device can be slide-mounted onto the post from an end thereof, with the device being slid into the given position along the post.

The device can be employed with a post that is suitable for use in fencing applications. Alternatively, the device can be employed with a post that forms part of a sign, barricade, marker, reflector, lighting, support, or retaining system etc. As mentioned above, in use the post can define an upright, rails, cross-members, struts, etc, and the device can be employed in and adapted for each context.

The device can be further adapted to mount items with respect to the post. In this regard, the device can eliminate the need to provide securing holes or retention passages in the post flange which are otherwise required to attach such items to the post. However, it should be appreciated that the device is still able to be used with a post that is formed with securing holes or retention passages. For example, one flange in the post can be deformed for engagement by the device, and the holes or passages can be formed into this or into another flange of the post.

In one form two projections can extend from the body (e.g. in the form of opposing arms).

In one form, in end profile, at least one of the projections can comprise a head at its remote end. The head can comprise an inner face that is disposed so as to facilitate its movement (e.g. by sliding) across a respective side of the flange as the device is mounted to the post. The head can be provided on each of the projections.

In one form a distal edge of the flange can be enlarged relative to a remainder of the flange. For example, the head can be connected to the body by a neck. The length of the neck can be such that, when the device is mounted to the post, the head sits snugly behind the deformed portion of the flange at its respective side of the flange. Further, at least the neck of each projection can be formed of a resiliently deformable material such that, during mounting, the neck can allow its head to deflect outwardly to enable the device to be snap-fitted to the post.

In one form the recess can be defined between an inner side face of the at least one head, and between inwardly disposed faces of the projections and body. The recess can be shaped such that it generally corresponds to the surface of the deformed portion of the flange when received in the recess. Thus, when the deformed flange portion comprises an enlarged distal edge (e.g. as defined in the first aspect) the recess can be shaped accordingly. This can provide a snug and secure fit of the device to the post.

In one form one or more discrete indentations can be provided in a spaced manner along the enlarged distal edge of the flange. Each device can be configured within its recess to be received in the indentation once the device has been mounted to the post, to retain the device against sliding along the flange distal edge. For example, the device can be configured by:

(a) providing a protuberance within the recess that is adapted to be received in a given indentation along a front face of the enlarged distal edge of the flange;

(b) providing a shaped, recess-facing internal face at the at least one head, that is adapted to interact with a correspondingly shaped rear face of the enlarged distal edge of the flange. The internal face can taper towards its distal end, and a corresponding series of inwardly tapered rebates can be provided along the rear face of the enlarged distal edge of the flange. Each rebate can receive the internal face when aligned therewith.

In another form, the device can be configured such that it can be slid, via an end of the enlarged distal edge, into the given position along the distal edge. Once in position along the post, the device can be constrained against further sliding movement by:

(i) forming the projections of a material that is able to be swaged such that, once the device is in position along the post, swaging of the projections causes the at least one head to be forced against an adjacent part of the flange. In this case, each of the projections can be provided with a head, whereby swaging of the projections causes each head to be forced against the adjacent part of the flange on either side thereof.

(ii) defining one of the heads on one of the projections as a moveable wedge such that, once the device is in position along the post, moving the wedge causes that head to be forced against an adjacent part of the flange. In this case, the one projection can be provided with an angled, recess-facing internal face along which a correspondingly angled face of the wedge can slide. The wedge can be screw-activated to cause it to slide along the angled internal face of the projection, whereby an outside face of the wedge can progressively be forced against the adjacent part of the flange.

(iii) providing ahead on one of the projections, and omitting the head on the other projection, wherein one or more grub screws are provided in the other projection, adjacent to a distal end thereof, such that, once the device is in position along the post, the one or more grub screws can be advanced against an adjacent part of the flange. In this case, two grub screws are provided in the other projection adjacent to its distal end, one above the other in-use.

In another alternative form of the device, the projections form part of a spring-loaded clip. In this case, the remote ends of the projections can be biased towards each other. For example, each projection can take the form a plate, and the body can take the form of an elongate half-pipe. Each plate can project from a respective elongate side of the half pipe to define the clip. A distal edge of each plate-like projection can be bent out and back to define around distal edge. Such an edge can be gripped by a circlip-type tool when mounting the clip (i.e. to bias apart the spring-loaded plates during mounting).

In this alternative form of the device, a transversely extending slot can be formed to extend into each plate from its distal edge. The slot can have a bell mouth at its opening (e.g. to easily receive a strand therein in use). Further, tabs can be formed to extend in from the sides of each plate. Each tab can be configured for engaging with a respective indentation defined in the flange sidewall.

In the various forms of the device outlined above, the device can be further configured to retain an item thereat such that, when the device is secured to the post, the item can be secured with respect to the post, wherein the item to be retained includes:

(i) a strand, in which case, the body and/or the projections can define a recess for receiving the strand therein and for retaining the strand at the post when the device is mounted to the post.

(ii) a retainer that is adapted for being secured with respect to the device, in which case the retainer can be adapted for securing a further item with respect to the body. Thus, when the device is secured to the post, the further item can be secured with respect to the post.

In (i) the body recess can be defined by two fingers that project out from an opposite side of the body to the projections. Ends of the fingers can overlap in a manner such that, to position the strand in the body recess in use, the strand needs to be skew-maneuvered with respect to the fingers.

Alternatively, in (i) the projections recess can enable the strand to be retained between the body and the distal edge of the flange when the device is mounted to the post. The projections recess can be defined by:
  (a) a slot that extends transversely through each projection from a distal end of the projection, towards or into the body; or
  (b) a slot that extends up and into each projection, and back towards the body, the slot extending from an in-use underside of the projection.

In (ii) the retainer can comprise:
  (1) a separate fastener that is releasably securable to the body. The separate fastener can then secure the further item at the body.
  (2) an element that is pivotally or hingedly mounted to the body for movement between a release position in which the further item can be released from or positioned ready for retention at the body, and a securing position in which the further item is securely retained by the element at the body.

The post to which the device of the second aspect is mounted can be otherwise as defined as in the system of the first aspect.

In a third aspect there is disclosed a post adapted for having at least one device mounted thereto. The post is of a type that comprises at least one elongate flange. In accordance with the third aspect a portion of a side of the flange comprises one or more indentations on each side of the flange to facilitate mounting of the device thereto. Alternatively, in accordance with the third aspect, a portion of a side of the flange comprises one or more deformations that are formed in a body of the flange away from a distal edge of the flange. The indentations or deformations facilitate mounting of the device to the post.

The indentations may be formed to extend along each side of a distal edge of the flange. The deformations may extend generally along a centerline of the body of the flange.

A plurality of indentations or deformations may extend generally along the flange, and the indented or deformed direction of adjacent indentations or deformations may alternate along the length of the flange.

BRIEF DESCRIPTION OF THE DRAWINGS

Notwithstanding any other forms which may fall within the scope of the system and device as defined in the Summary, specific embodiments will now be described, by way of example only, with reference to the accompanying drawings in which:

FIG. 1 shows a perspective view of a first post for use in the system;

FIG. 2 shows an end view of the post of FIG. 1;

FIGS. 7A to 7C respectively show side, front and plan views of a first embodiment of a mounting device for use with the posts of FIGS. 1 to 6;

FIGS. 24A to 24C show, in schematic depiction, plan, side, and in-use views of yet another embodiment of a mounting device for use with another post embodiment as shown in the end, side detail, and sectional views of FIGS. 24D to 24F.

DETAILED DESCRIPTION OF SPECIFIC EMBODIMENTS

Prior to describing various embodiments of the mounting device, a number of posts will first be described with reference to FIGS. 1 to 6, 18A to 18D, 19A to 19D and 24D to 24F. These posts have been modified to make them suitable for use in a mounting system and for use with a mounting device as disclosed herein.

Whilst the posts depicted in FIGS. 1 to 6, 18A to 18D, 19A to 19D and 24D to 24F are typically employed in upright configurations, it should be understood that the mounting system and mounting device as disclosed herein can be applied to like posts when used as rails, cross-members, stays, struts, etc.

Post Embodiments

In FIGS. 1 to 5, a post that is suitable for use with a mounting system and various mounting devices is shown in the form of a picket-like fence post 10. Such a fence post may be hot roll-formed from steel, or injection or extrusion moulded from plastic. Whilst the post 10 is suitable for use in fencing applications it should be appreciated that it is not in any way limited to such applications, and may be used as part of a sign or barricade, as a marker, as a support, as part of a retaining system, as part of a reflector or lighting system, etc.

Figure 6:
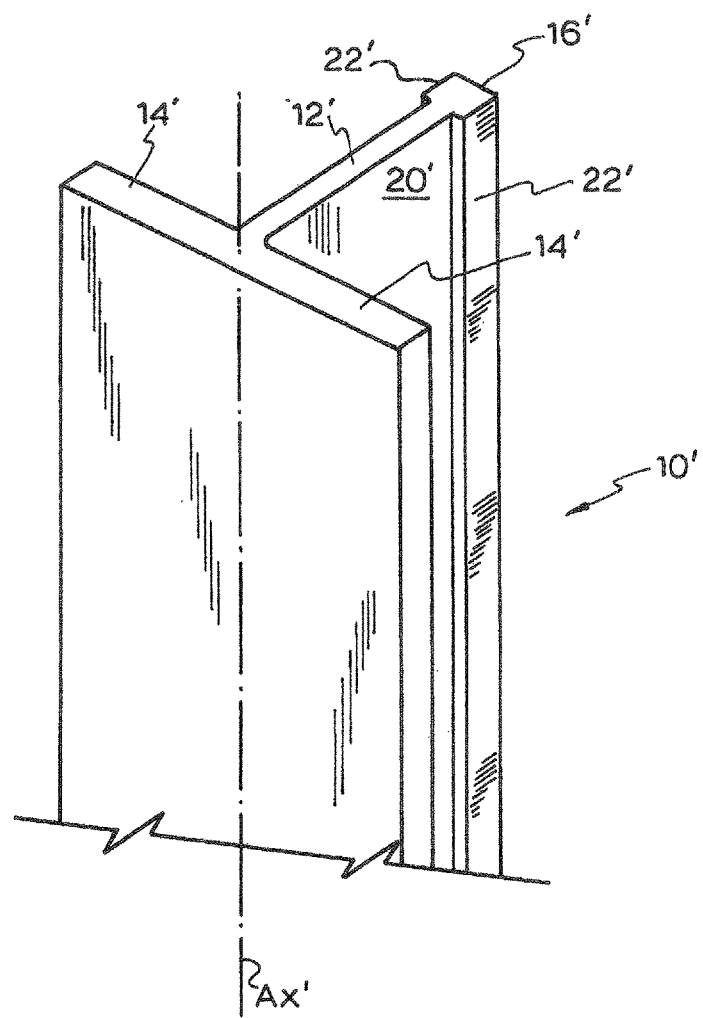
FIG. 6 shows a perspective view of a second post for use in the system.

The fence post 10 depicted comprises three elongate flanges in the form of a stalk 12 and wings 14 that project out and along the length of the post in different directions from a post longitudinal axis Ax. The stalk 12 and wings 14 can project with respect to the axis so as to define a Y-shaped post as shown in FIGS. 1 to 5, 18, 19 and 24. Alternatively, and as shown in FIG. 6, the stalk 12' and wings 14' can project with respect to an axis Ax' so as to define a T-profiled post. In each of these embodiments the stalk defines a stem or base web of the Y or T shape (i.e. the stalk represents a dominant flange in the profile). Posts with flanges that vary on the general Y and T shapes can also be employed.

In accordance with the present disclosure, at least a part (usually the whole) length of a distal edge 16 of the stalk material is deformed (e.g. by a roll-forming, cold-forming, moulding or machining step) to define at least one stalk shoulder 13 so as to enable a mounting device to be secured thereto, as described below in FIGS. 7 to 25.

Figure 18A:
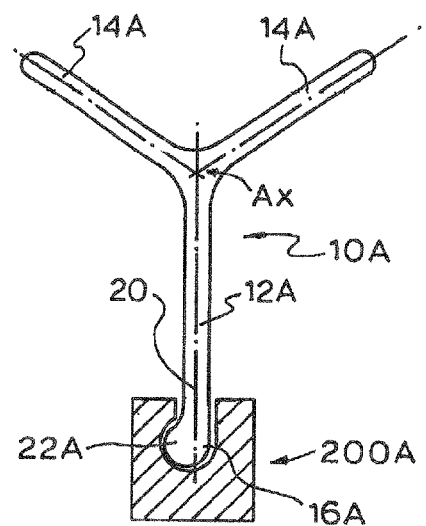
FIGS. 18A to 18D show, in schematic depiction, end views of variations to the post of FIG. 1, and with a schematic depiction of a respective mounting device for each such post variation.
Figure 18B:
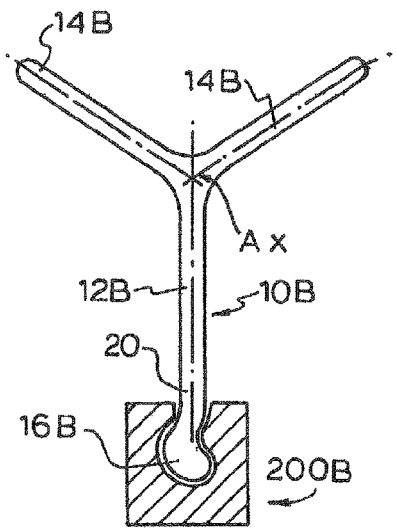

In the posts of FIGS. 1 to 6 and 18A, C & D, and 19A to 19D the distal edge 16 has been deformed so as to be enlarged with respect to an adjacent part 20 of the stalk 12, whereas in the post of FIG. 18B the distal edge 16 has been deformed to be bent (curved) with respect to the adjacent part 20.

In the post of FIG. 24, instead of deforming the distal edge, the body of the stalk is deformed by indenting it during or after roll forming in an alternating manner along its length (as described below). In each case, such deforming of the stalk is relatively easily achieved in the post during its manufacture (e.g. during or after roll forming).

For example, in the case of a hot roll-forming procedure for the post, to deform the distal edge 16, only the rolls of the final pass (or passes) require modification. Further, the roll modification is such as to still allow for continuous post production.

In the case of a post that is injection or extrusion moulded from plastic, only the cavity of the mould or die requires modification where the stalk is to be deformed. In the case of extrusion moulding, the die modification is such as to still allow for continuous post extrusion.

Further, it will be seen that the deformed distal edge 16, or the deformed body of stalk 12, extends for a substantial part of the stalk length (i.e. right down to the location where the fence post 10 comprises a pointed end 18—FIG. 1). The pointed end 18 defines the fence post as a picket. The deformation of a substantial length of stalk enables a number of the same or different mounting devices to be secured at multiple positions along the post (e.g. for securing multiple fencing strands, different items etc along the post).

The mounting device as disclosed herein, in conjunction with the deformed stalk, can eliminate the need for holes or passages in the stalk. The mounting device as disclosed herein can be used to secure various items to the post, as shown in FIGS. 7 to 25. Thus, once the mounting device is secured to the fence post, the item can be secured by the device with respect to the fence post. This arrangement can provide a whole new type of post mounting system that can offer considerable time savings and improved flexibility over existing mechanisms used to secure items (such as fencing strands etc) to a post.

In addition, it has been observed that deformation of the stalk may increase the bend strength of the resultant post. The elimination of holes or passages also avoids areas of weakness, and eliminates corrosion regions and sharp catch points. In fact, it has been observed that, for a given required post strength, less post material is required than with existing posts having holes or passages. This can make the resultant post both cheaper and lighter.

For the post that is specifically depicted in FIGS. 3 to 5 and 19B it will be seen that the enlargement of the distal edge 16 is defined by elongate lugs 22 that project laterally from opposite sides of the distal edge and for the length of that edge. Thus, a small T-shaped profile is defined at the distal edge, with the lugs 22 defining the top of such a T. This distal edge shape has been observed to provide excellent securement for a mounting device, with the device securing about each side of the distal edge (as described below). However, as shown in FIGS. 18A to D, and 19A, C and D, other shapes can be formed at the distal edge. These include a single laterally projecting elongate lug (FIG. 18A), an elongate hook profile (FIG. 18B), a bulb-like profile (FIG. 18C), a "dog-bone" profile (FIG. 18D), an enlarged distal end section 23 (FIGS. 19A and 19D), and a modified (castellated) enlarged distal end section 23' (FIGS. 19C & E).

Figure 3:
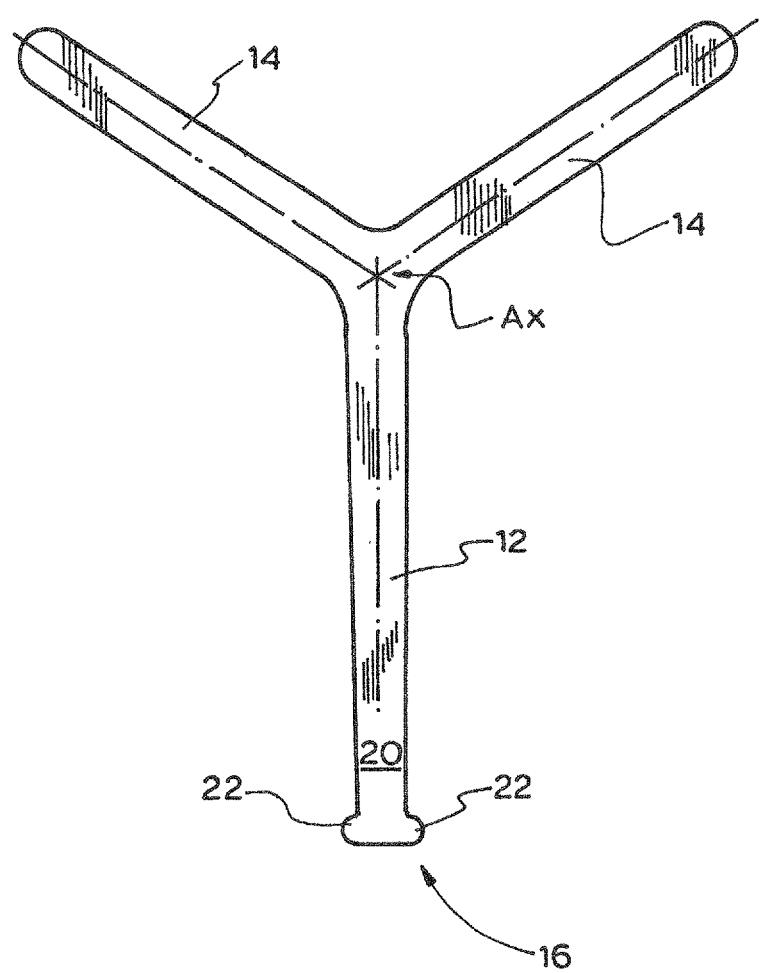
FIG. 3 shows an enlargement of the post view shown in FIG. 2.
Figure 4:
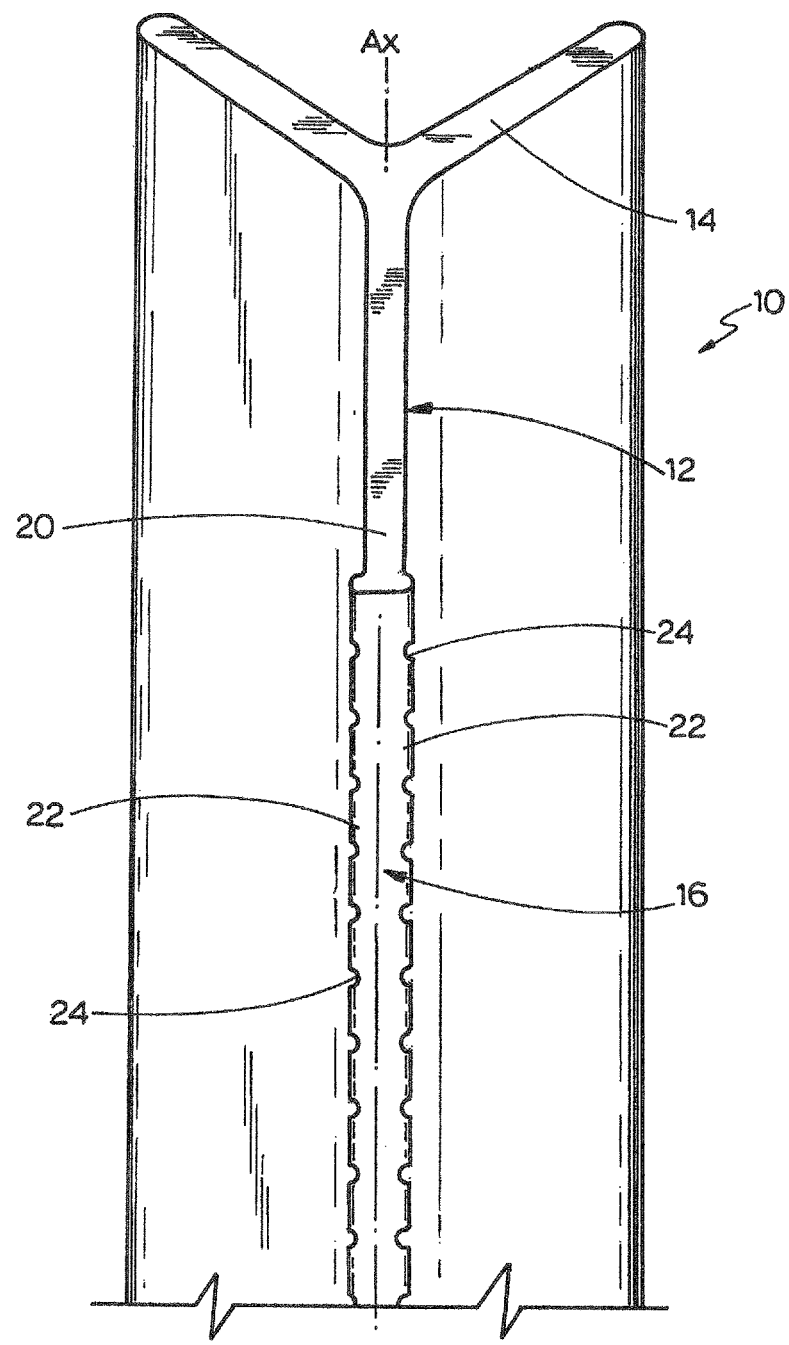
FIGS. 4 and 5 show alternate perspective details of the post of FIG. 1.
Figure 5:
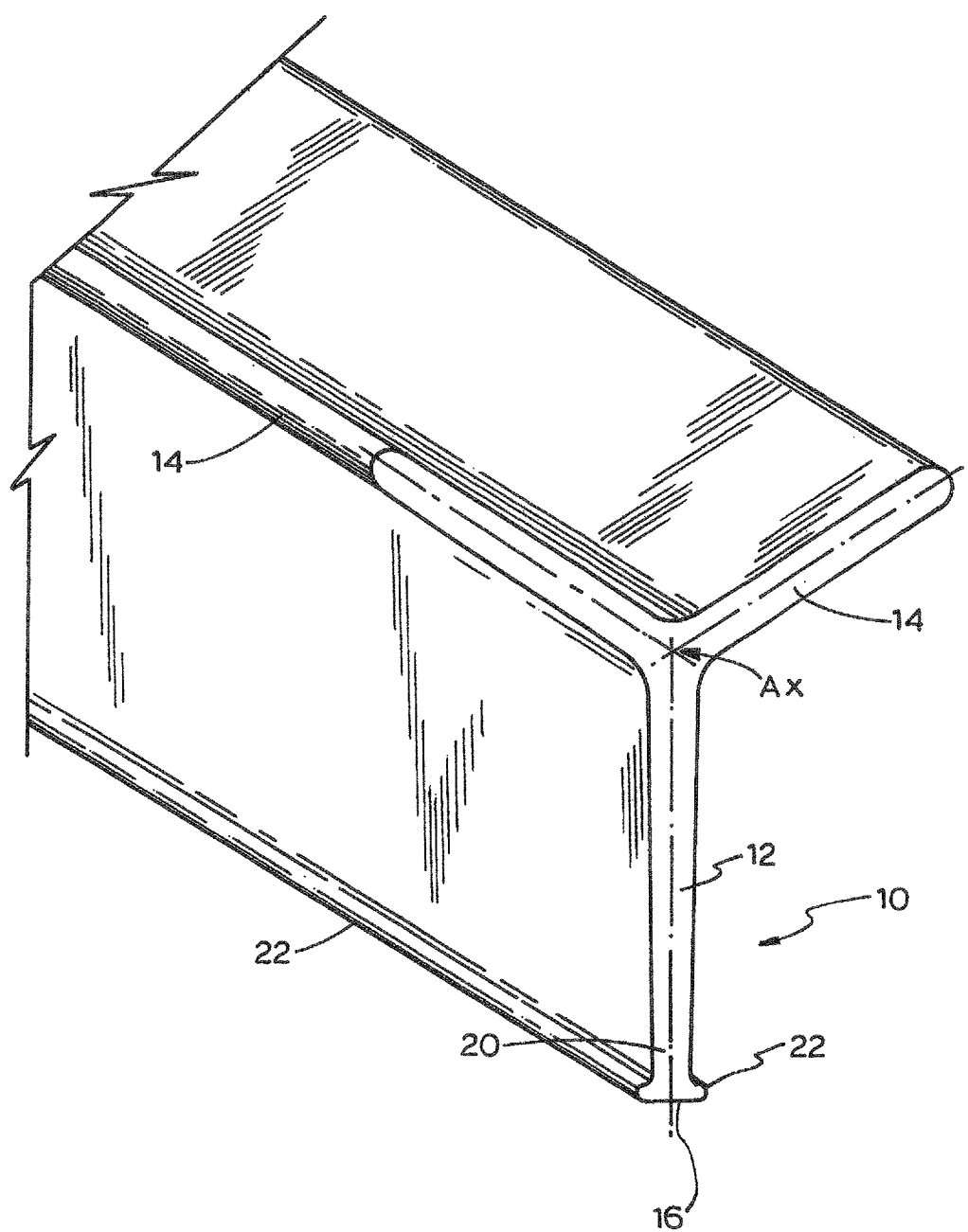

In the post embodiment of FIG. 4, a plurality of spaced discrete indentations are provided along the outside of the distal edge 16 in the form of pairs of opposing notches 24. Each notch 24 of a given pair is formed on a respective one of the opposing respective lugs 22. In a first variation, the notches can be formed as a series spaced along just one of the lugs. In a second variation, the notches can be formed as a series spaced along the opposing lugs in an alternating manner. The notches are configured such that they cooperate with a part of the mounting device to secure (i.e. to resist or restrict) the device against sliding movement along the post (as described below).

Figure 19A:
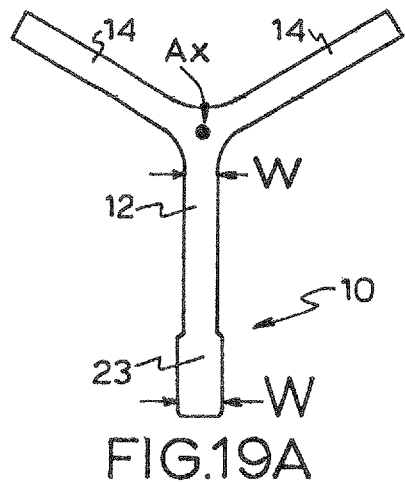
FIGS. 19A, 19C and 19D show, in schematic depiction, end views of further variations to the post of FIG. 1, with FIG. 19B being provided for comparative purposes, and with FIG. 19E being a section taken on the line E-E of FIG. 19C.
Figure 19B:
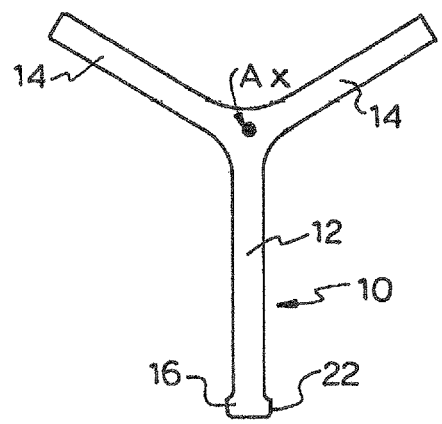
Figure 19C:
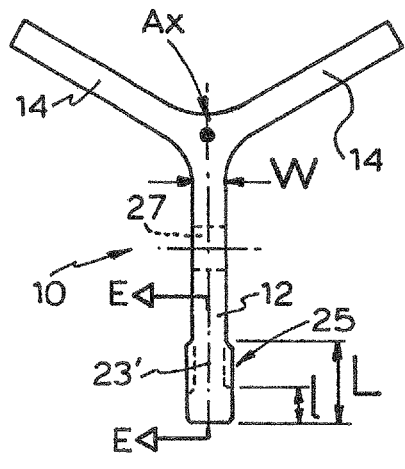

In the post embodiment of FIG. 19C, the indentations take the form of opposing triangular of V-shaped rebates 25. The rebates extend along the inside of the enlarged distal end section 23', as shown by FIGS. 19C and 19E, and give the shoulder a castellated appearance (as shown in FIG. 19E). The post of FIG. 19C is adapted at the rebates 25 to interfere with a corresponding mounting device (as explained below). In other variations, the rebates can be formed as a series of adjacent notches, square or curved rebates, etc.

FIG. 6 shows another post in the form of steel fence post 10', where similar or like parts to the fence post 10 are indicated by the same reference numeral but marked with a prime'. In the fence post 10' the stalk 12' and wings 14' project with respect to the axis Ax' so as to define a T-shaped profile. The attributes and functioning of the T-shaped post is otherwise as described for the post embodiment of FIGS. 1 to 5 and hence will not be re-described.

FIGS. 18A to 18D show four variations to the post 10 of FIGS. 1 to 5. Similar or like parts to the fence post 10 are indicated by the same reference numeral, but designated with the suffix A, B, C or D. Like the post 10 of FIGS. 1 to 5, in the fence posts 10A to 10D the stalk 12 and wings 14 project with respect to the axis Ax so as to define a Y-shaped profile.

In the post 10A of FIG. 18A the distal edge 16A is defined by a single laterally projecting elongate lug 22A. A mounting device (as schematically shown) for such a redefined distal edge 16A is modified accordingly.

In the post 10B of FIG. 18B the distal edge 16B is defined as an elongate hook profile. In this embodiment, instead of being enlarged, the thickness of the hook portion may generally be the same as or even less than the remainder of the stalk 12B. Again, a mounting device for the redefined distal edge 16B is modified accordingly.

Figure 18C:
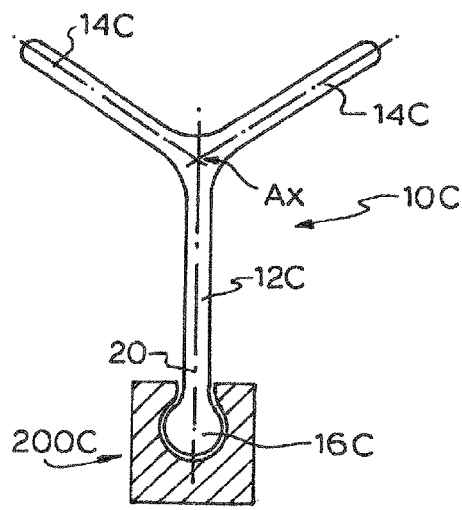

In the post 10C of FIG. 18C the distal edge 16C is defined to have a bulbous profile. Again, amounting device for the redefined distal edge 16C is modified accordingly.

Figure 18D:
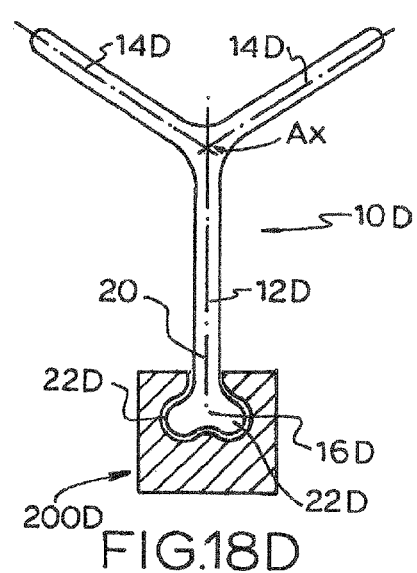

In the post 10D of FIG. 18D the distal edge 16D is defined by a two forwardly and laterally projecting elongate lugs 22D that give a "dog-bone" appearance to the profile. Again, a mounting device for the redefined distal edge 16D is modified accordingly.

Each of the distal edges 16A to 16D can be provided with notches 24 therealong for interference with the mounting device, as described below. The attributes and functioning of the posts 10A to 10D are otherwise as described for the post embodiment of FIGS. 1 to 5 and hence will not be re-described.

Figure 19D:
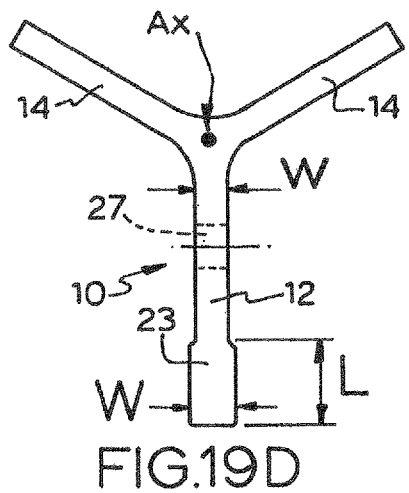
Figure 19E:
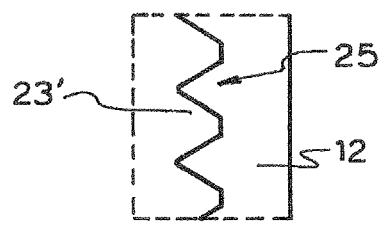

FIGS. 19A, 19C and 19D show another three variations to the post 10 of FIGS. 1 to 5, with the post of FIG. 19B being akin to the post 10 of FIGS. 1 to 5. Again, similar or like parts to the fence post 10 are indicated by the same reference numerals. Like the post 10 of FIGS. 1 to 5, in the fence posts 10 of FIGS. 19A to 19D the stalk 12 and wings 14 project with respect to the axis Ax so as to define a Y-shaped profile.

The posts of FIGS. 19A and 19D are alike, although the post of FIG. 19A is manufactured without holes, whereas the post of FIG. 19D is provided with a series of holes 27 along the stalk 12 (e.g. 8 mm holes provided on or close to a neutral bending axis of the stalk). In each of the posts of FIGS. 19A and 19D the enlarged distal end section 23 has a width W that is greater than the width w of the stalk 12, but that is less than the length L of the end section. Because the area of section 23 is longer than wide, the post is stronger than a conventional Y-post and yet is no heavier. Typical though non-limiting dimensions are W=4.6 mm, w=2.8 mm and L=8 mm. In post 19B, the width W is greater than the length L, and the corresponding dimensions are W=4.6 mm, w=2.8 mm and L=2 mm.

The post of FIG. 19C is similar to the post of FIG. 19D, except that the modified distal end section 23' has a width W that is greater than the first length 1 of the end section (corresponding to the depth of the rebate base), and that is less than the second length L of the end section. Typical though non-limiting dimensions are W=4.6 mm, w=2.8 mm, 1=6 mm, and L=10 mm. The post of FIG. 19C may or may not be provided with holes 27.

The post 210 of FIGS. 24D to F presents a different concept to the previous posts 10. Whereas the posts 10 have the distal edge 16 of stalk 12 deformed, in the post 210 the body (i.e. not the distal edge) of the stalk 212 is deformed. In this regard, a series of alternating indentations 220 are formed (e.g. hot roll-formed or subsequently cold-form processed) into the body of the stalk 212. The arrows shown in each indentation in FIG. 24E indicate in the view whether the indentation projects out or in. The sectional view in FIG. 24F is taken on the lines F-F of FIGS. 24D and 24E. This series of indentations render the post 210 suitable for mounting a spring clip, as will be described below with reference to FIGS. 24A to 24C.

Mounting Device Embodiments

In each of the mounting device embodiments that will now be described, it will be seen that the projecting arms (or the like) that locate on either side of the stalk are configured to engage with the deformed portion of the stalk including with one or more stalk shoulders to resist lateral movement away from the stalk as soon as the device has been located in a given, desired position along the stalk. This in-built ability of each device facilitates a rapid and simple device-to-post mounting. It also allows for mechanisation of the device-to-post mounting operation, whereby the device can be mounted to the stalk in a single action, such as by an automatic (e.g. pneumatic gun-type) tool.

Referring now to FIGS. 7A to 7C a first mounting device embodiment is shown in the form of a first clip 30. Clip 30 is adapted for mounting (i.e. clipping) onto the posts 10, 10'. The clip 30 is usually formed from a resiliently deformable material (e.g. moulded from a plastic or metal alloy, such as by injection moulding or die casting). Clip 30 can of course be modified (e.g. by reshaping the mould) for mounting onto each of the posts shown in FIGS. 18 and 19.

The clip 30 comprises an elongate body 32 that has members in the form of elongate projecting arms 34 extending from opposite sides thereof. Each arm comprises an enlarged head 36 that has an inside curved face 37 to facilitate mounting onto the distal edge 16 of a given post. The head 36 also defines a shoulder 38. When mounted to the post, each shoulder sits behind a respective elongate lug 22 to securely fasten the clip 30 to the distal edge 16, as shown in FIGS. 7A and 7B.

Figure 9:
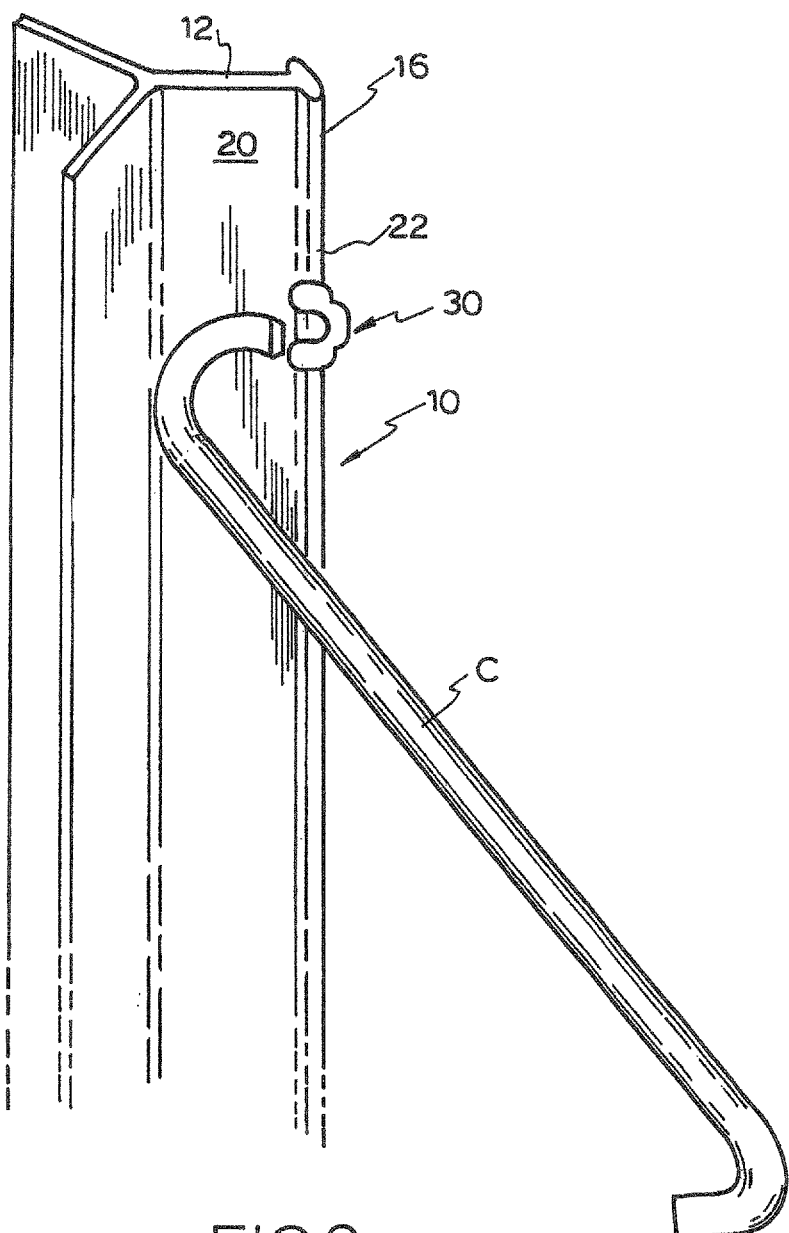
FIG. 9 shows a schematic perspective view of the post of FIG. 1 with the device of FIG. 8 mounted thereto, as well as a tool for the removal of the device from the post.

In this regard, the clip can be pushed onto the distal edge 16, with the lugs 22 riding along the respective curved faces 37 via opening O defined between the clip arms 34, with the edge 16 locating into recess R. This causes the arms to deform and flex outwardly until the lugs 22 pass behind the clip shoulders 38 such that the projecting arms 34 clamp together to engage the stalk 12 including the stalk shoulder 13. This is a type of snap-on action, with removal (as shown in FIG. 9) being a type of snap-off action. As an alternative, the clip may be slide-mounted along the post via the post end (e.g. when not of a deformable material).

The clip body 32 is also formed with a recess 40 therein. The recess can receive a fencing strand S therethrough as best shown in FIG. 7A. Thus, when the strand S is loaded into recess 40, and the clip 30 is snapped onto the distal edge 16, the strand S becomes secured with respect to the post 10. As can be seen from FIGS. 7A-7C, recess R and recess 40 intersect with one another.

An inside surface of one or each arm 34, at a neck region 42, can be provided with one or more discrete, inwardly projecting protuberances 44. Each protuberance can be integrally moulded into the clip and is aligned in use to project into and interfere with a respective notch 24, once the clip 30 has been snapped (or slid) onto the distal edge 16. This interference can prevent the clip from being easily slid up or down the post, thus maintaining its position in use (and also maintaining the vertical position of the strand S along the post).

Figure 8A:
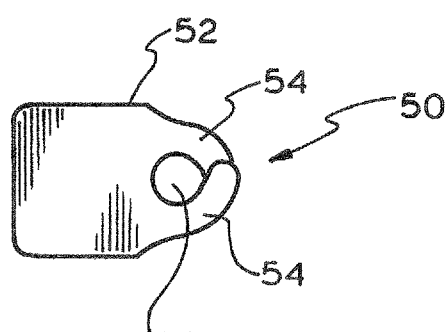
FIGS. 8A and 8B respectively show plan and side views of a second embodiment of a mounting device for use with the posts of FIGS. 1 to 6.
Figure 8B:
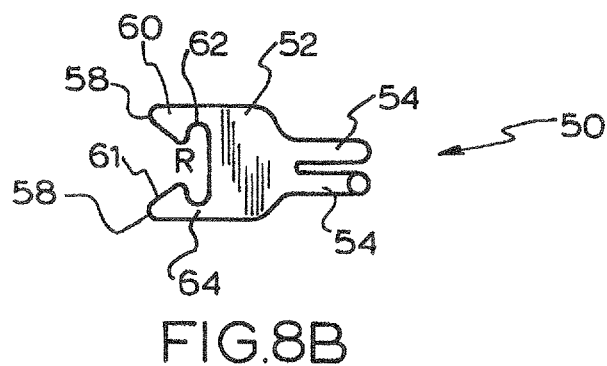

Referring now to FIGS. 8A and 8B another mounting device in the form of a second clip 50 is shown for mounting (i.e. clipping) onto the posts 10, 10'. The clip 50 may also be formed from a resiliently deformable material such as a plastic or metal alloy (e.g. by injection moulding, die casting etc).

The clip 50 comprises a body 52 that has projecting curved, spaced fingers 54 extending from a front side of the body. In side elevation (FIG. 8A) the finger ends overlap. This defines a type of recess 56 that can receive the strand S therethrough (i.e. the strand is angled and passed between the fingers) to secure it in the clip 50 in use.

Like clip 30, the body 52 has members in the form of elongate projecting arms 58 that extend from opposite sides of the body, with each arm comprising an enlarged head 60 that defines a tapering inner face 61 and a shoulder 62. When mounted to the post, each shoulder sits behind a respective elongate lug 22 to securely fasten the clip 50 to the distal edge 16. Again the lugs 22 pass via the opening and ride along the inner face 61, causing the arms to deform and flex outwardly until the lugs 22 pass behind the shoulders 62, with the edge 16 locating in recess R. Again, this is a type of snap-on action, with removal being a type of snap-off action. However, the clip 50 may be slide-mounted along the post via an end thereof.

Again, the neck region 64 of each arm 58 can be provided with one or more discrete, inwardly projecting protuberances that can be aligned to project into a respective notch 24 once the clip 50 has been snapped onto the distal edge 16 (i.e. to prevent the clip from being easily slid up or down the post in use), thus maintaining its position, and also the vertical position of the strand S.

The fence posts 10, 10', and as shown in FIGS. 18 and 19, are able to secure a plurality of the clips 30 therealong. Each such clip can be configured for securing a respective strand S with respect to the post. However, each device is able be configured differently to secure other items to the post, such as crossbars, tape, cord, signage etc. In this regard, the shape and configuration of the body 32, 52 can be modified accordingly (see e.g. FIGS. 10 to 25).

FIG. 9 shows a tool in the form of a crowbar C for prising a clip 30, 50 off the post distal edge 16 (e.g. to remove, replace, or service a strand).

Figure 10:
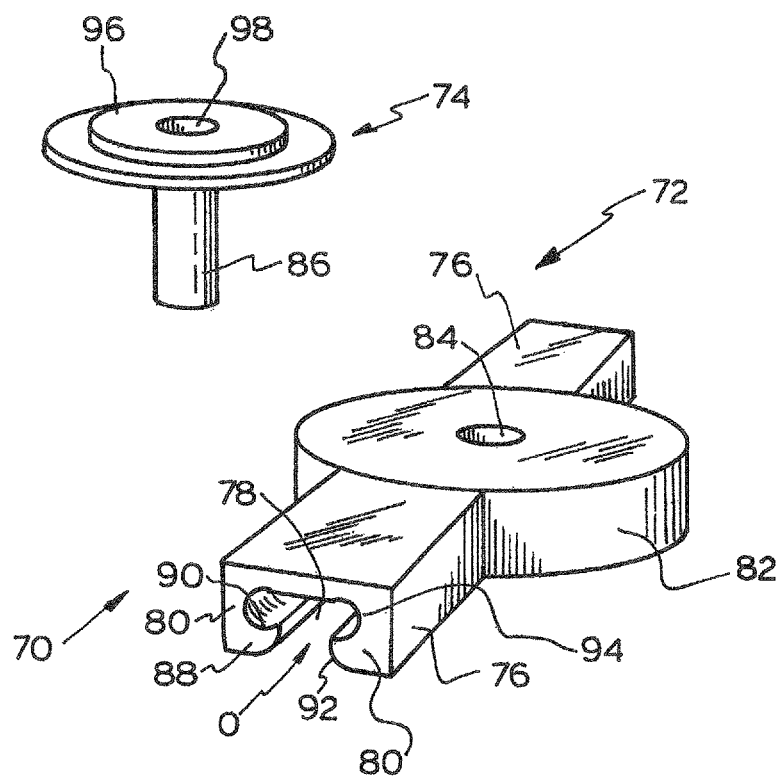
FIG. 10 shows a perspective view of a third embodiment of a mounting device for use with the posts of FIGS. 1 to 6.
Figure 11:
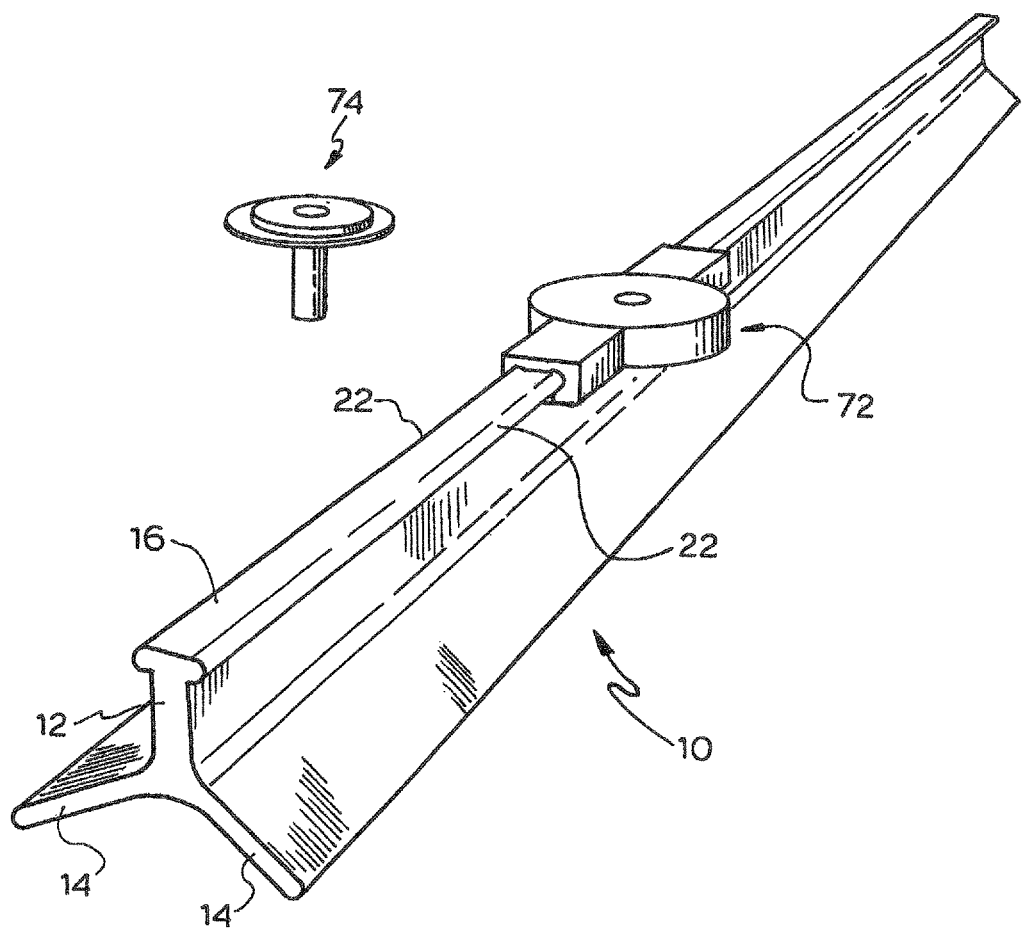
FIG. 11 shows a perspective view of the mounting device of FIG. 10 when mounted to a post according to FIGS. 1 and 2.

Referring now to FIGS. 10 to 13 another mounting device in the form of a third clip 70 is shown for mounting (i.e. clipping) onto the posts 10, 10'. The clip 70 comprises a body part 72 and a separate retention part 74. At least the body part 72 may be formed from a resiliently deformable material such as aplastic or metal alloy (e.g. by injection moulding or die casting) to facilitate its clipping onto a post (FIG. 11).

The body part 72 comprises an elongate bar 76 that has an elongate recess 78 formed therethrough to define members in the form of projecting spaced elongate flanges 80. The flanges extend for the length of the bar 76 on opposing sides thereof. An enlarged mounting disc 82 is centrally formed into the bar 76 and has a central aperture 84 defined therein to receive a shank 86 of the retention part 74 thereinto.

Each flange 80 comprises an enlarged head 88 that defines a shoulder 90. As shown in FIG. 11, when the clip 70 is mounted to the post, each shoulder sits behind a respective elongate lug 22 to securely fasten the clip to the distal edge 16. In this regard, the lugs 22 pass into opening O and ride along curved inner faces 92 of the flanges 80, causing the flanges to deform and flex outwardly until the lugs 22 pass behind the shoulders 90 in a type of snap-on action, with the edge 16 locating in recess 78. Removal of clip 70 is a type of snap-off action. Alternatively, clip 70 can be slide-mounted onto the post from an end thereof.

Again, the inside surface of neck region 94 of each flange can be provided with one or more discrete, inwardly projecting protuberances that can be aligned to project into a respective notch 24 once the clip 70 has been snapped onto the distal edge 16 (i.e. to prevent the clip from being easily slid up or down the post in use), thus maintaining its position along the post.

In the clip 70 the retention part 74 also comprises a disc-like body 96 from which the shank 86 extends. The retention part 74 may also be moulded from a plastic material (e.g. by injection moulding) or it may be machined or die-cast from a metal alloy (e.g. a weather resistant alloy). The shank 86 can be solid in which case it can be adapted to fasten into the central aperture 84 of mounting disc 82 (e.g. by a screw, interference, push or friction fit). Alternatively, it can be hollow in which case a separate mechanical fastener (e.g. a self-tapping screw) can be inserted through an aperture 98 of body 96 and into the shank, to fasten the retention part 74 to the mounting disc 82.

Figure 12:
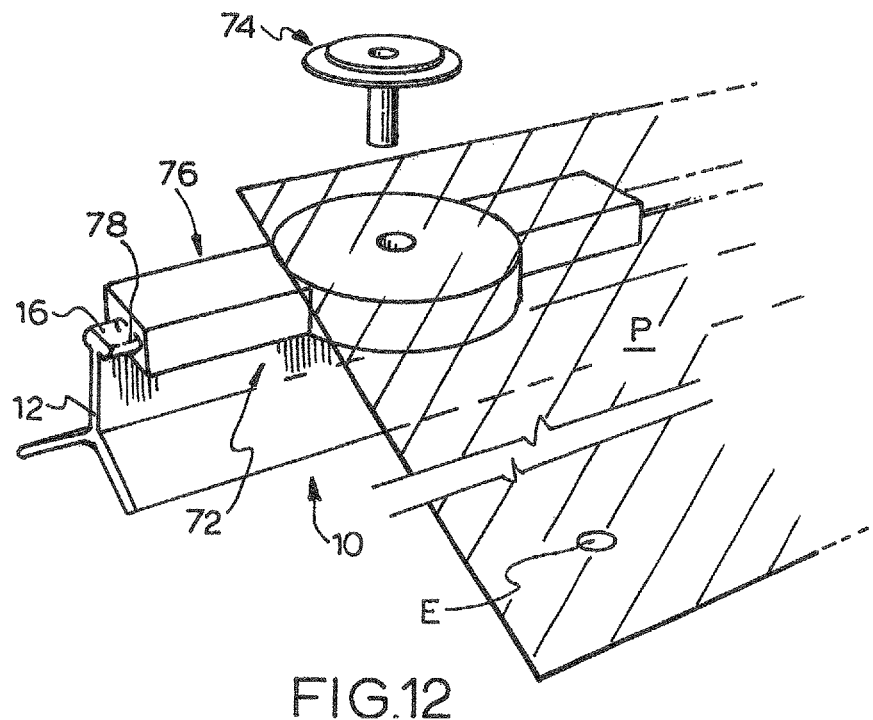
FIG. 12 shows a perspective view of the mounting device of FIG. 10 prior to mounting a planar article to a post according to FIGS. 1 and 2.

As shown in FIG. 12, a planar article P (e.g. a sign or placard) can be located on the body part 72, between it and the retention part 74. The body part may have already been secured onto the post 10, or it may be subsequently secured. A suitably sized eyelet E can be formed in the article P (e.g. at a corner, or adjacent to an edge thereof). This eyelet can be positioned over the central aperture 84, and the shank 86 can then be inserted through the eyelet and into the aperture 84. If a separate fastener is employed, this can then be used to fasten the retention part 74 to the body part 72, thus securing the article P to the post.

Figure 13:
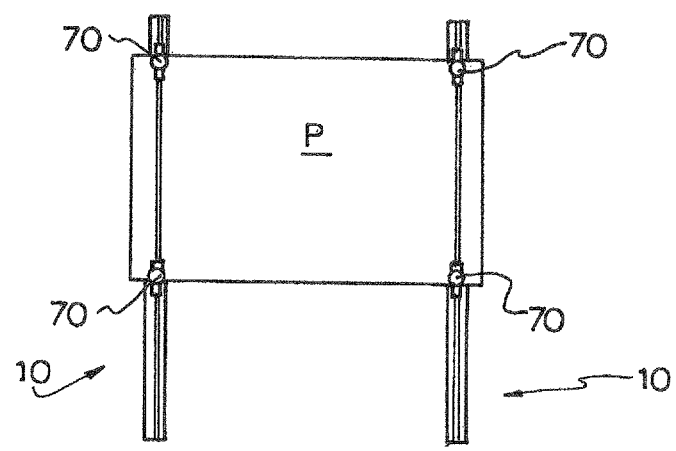
FIG. 13 shows a front view of the planar article of FIG. 12 when mounted to two spaced posts using four of the mounting devices according to FIG. 10.
Figure 14:
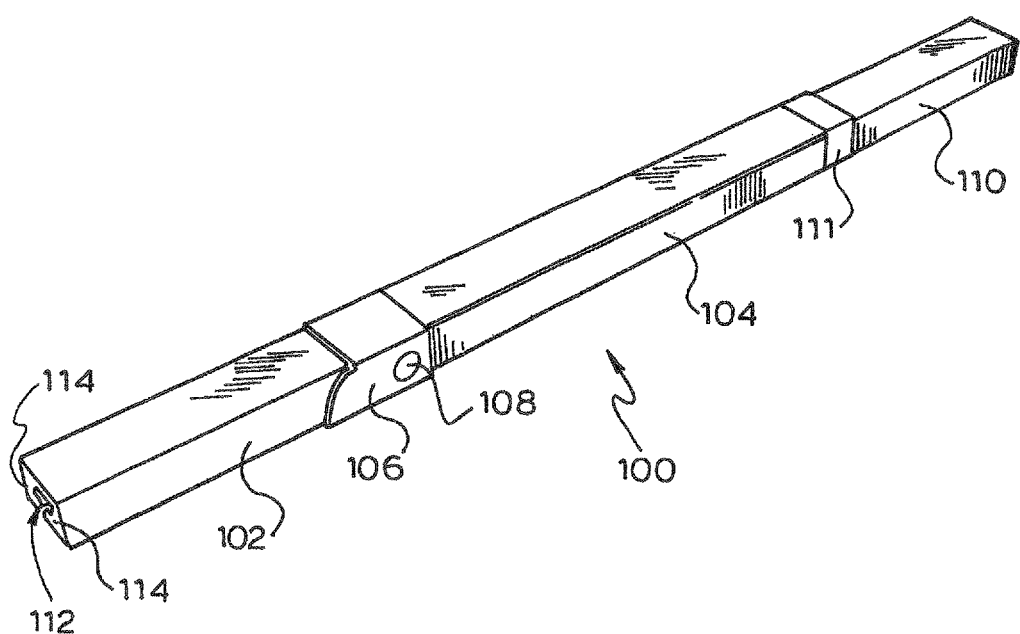
FIG. 14 shows a perspective view of a fourth embodiment of a mounting device for use with the posts of FIGS. 1 to 6.

As shown in FIG. 13, each fence post 10, 10' is able to secure a plurality (e.g. two or three) of the clips 70 therealong to mount and support a respective edge of the planar article P to each post.

In one mode, the posts are first fitted with the respective body parts 72 of the clips 70, the article P is then positioned adjacent to the body parts 72, and then the retention parts 74 are secured into their respective body parts 72. In another mode, the article P is first fitted with four clips 70 adjacent to its four respective corners, and then the clips are secured onto their respective posts. In either case, the clip 70 provides a rapid means of securing a planar article (such as a sign or placard) to one or more fence posts.

Referring now to FIGS. 14 to 17 yet another mounting device in the form of a fourth clip 100 is shown for mounting (i.e. clipping) onto the posts 10, 10'. The clip 100 comprises a first elongate clip part 102 that has a channel retention portion 104 hingedly mounted thereto via a hinge body 106. The hinge body is connected to one end of portion 104 and is pivotable on a hinge pin 108 that extends into first clip part 102.

The clip 100 further comprises a second elongate clip part 110 that cooperates with a remote end of the channel retention portion 104. In this regard, the channel retention portion 104 comprises an end piece 111, being a short section of C-channel. The end piece 111 has an inside dimension that is sized to interfere (in an interference or friction fit) with the second clip part 110 when in the "closed" (non-pivoted) position, to securely retain (e.g. releasably lock) the portion 104 in this position.

Figure 15:
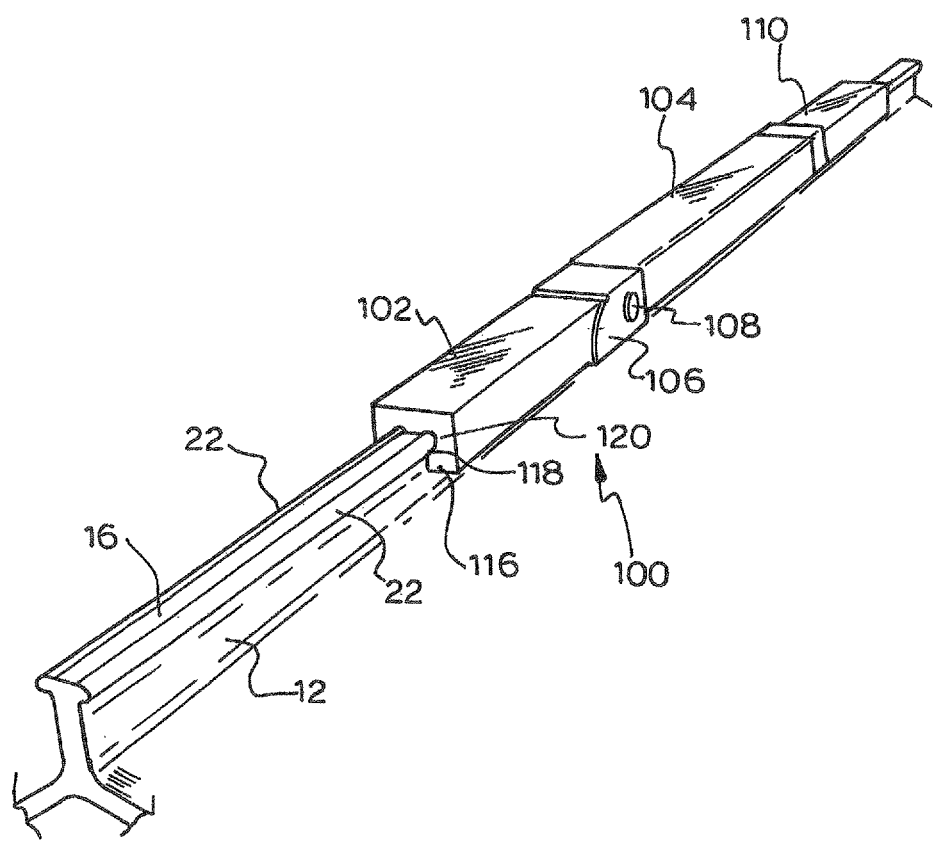
FIG. 15 shows a perspective view of the mounting device of FIG. 14 when mounted to a post according to FIGS. 1 and 2.

At least the first and second clip parts 102, 110 may be formed from a resiliently deformable material such as a plastic or metal alloy (e.g. by injection moulding or die casting) to facilitate their clipping onto a post (FIG. 15). The channel retention portion 104, being of a channel section, can be formed from plastic or metal (e.g. a weather resistant alloy).

The first clip part 102 takes the form of an elongate bar and comprises an elongate recess 112 formed therethrough to define members in the for in of projecting spaced elongate flanges 114. Again, the flanges extend for the length of the part 102 on opposing sides thereof. Similarly, the second clip part 110 takes the form of an elongate bar and comprises an elongate recess formed therethrough to define members in the form of projecting spaced elongate flanges that extend for the length of the part 102 on opposing sides thereof.

Much like the elongate bar 76 of clip 70 in FIGS. 10 to 12, each flange of the first and second clip parts 102, 110 comprises an enlarged head that defines a shoulder. For example, as shown in FIG. 15, first clip part 102 comprises an enlarged head 116 that defines a shoulder 118. When mounted to the post 10, each of the shoulders on the first and second clip parts sits behind a respective elongate lug 22 to securely fasten the parts to the distal edge 16. Again, the lugs 22 pass into an opening of the elongate recess of each of the first and second clip parts. The lugs ride along curved inner faces of the flanges, causing the flanges to deform and flex outwardly until the lugs 22 pass behind the shoulders in a type of snap-on action (with removal being a type of snap-off action). Alternatively, clip 100 can be slide-mounted via an end of the post.

Again, the inside surface of a neck region (e.g. region 120 in FIG. 15) of each flange can be provided with one or more discrete, inwardly projecting protuberances that can be aligned to project into a respective notch 24 once the clip first and second clip parts have been snapped onto the distal edge 16 (i.e. to prevent each part from being easily slid up or down the post in use), thus maintaining its respective position along the post.

Figure 16:
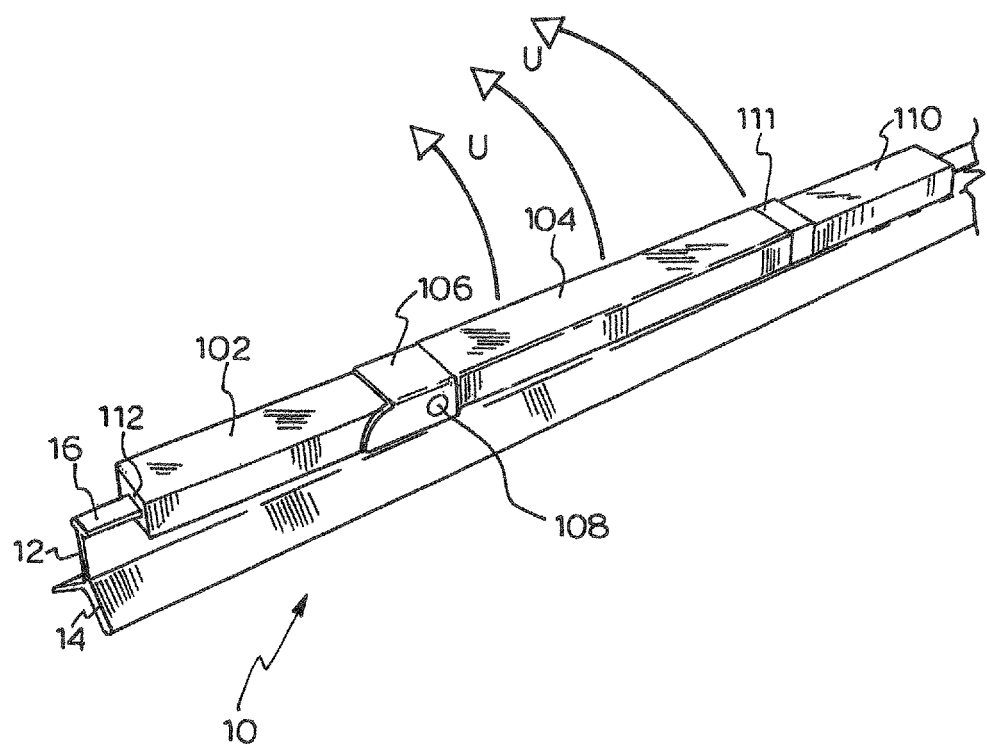
FIG. 16 shows a perspective view of the mounting device of FIG. 14 prior to mounting to the post and schematically illustrating a mode of operation.

As schematically indicated in FIG. 16, with the first and second clip parts 102, 110 clipped onto the post 10, the channel retention portion 104 is able to be pivoted up (arrows U) and away from the post, being urged out of its secured position, with the hinge body 106 pivoting on hinge pin 108.

Figure 17:
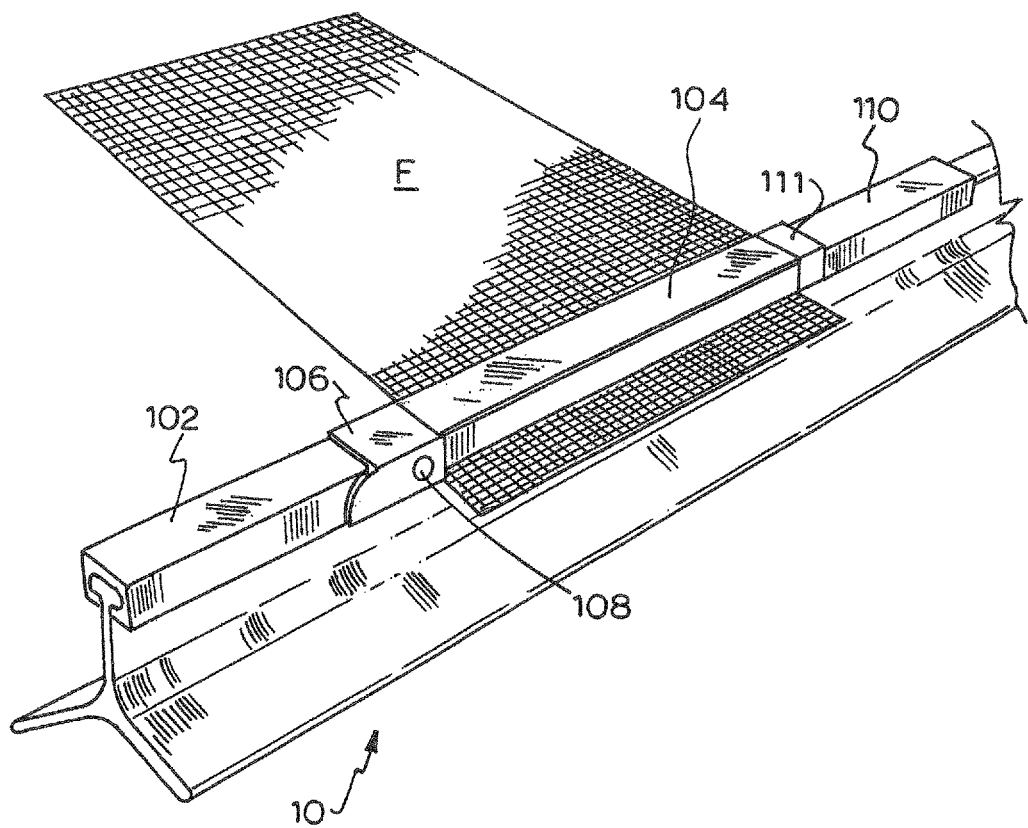
FIG. 17 shows a perspective view of a flexible planar article being mounted to a post using the mounting device according to FIG. 14.

As shown in FIG. 17, a flexible planar article F (e.g. a woven geofabric, shade cloth or mesh) can now be located under the channel retention portion 104 (i.e. between it and the distal edge of the post). The channel retention portion 104 can then be pivoted back down to its closed position to clamp and retain the article F with respect to the post.

A plurality (e.g. two to three) of the clips 100 can be employed along a fence post 10, 10' to support a respective wide edge of the article F along the post. However, the channel portion 104 can have a length corresponding to a substantial length of the post, such that only one clip 100 per post may be required. In addition, two or more spaced posts can each be provided with one or a plurality of the clips 100 to support the flexible planar article F as it extends between adjacent posts in a wall, fence, barricade or retention arrangement (e.g. as an earth retention device when article F comprises geofabric).

FIGS. 18A to 18D schematically indicate respective clips 200A-200D that each comprise a recess that has been shaped to the formation of its respective distal edge 16A-16D. Each clip 200A-200D can take the general form of clip 30, 50, 70, 100 etc, with the arms of each clip being modified to suit the distal edge shaping. For example, only one of the arms of clip 200A has an enlarged head at its remote end.

Figure 20:
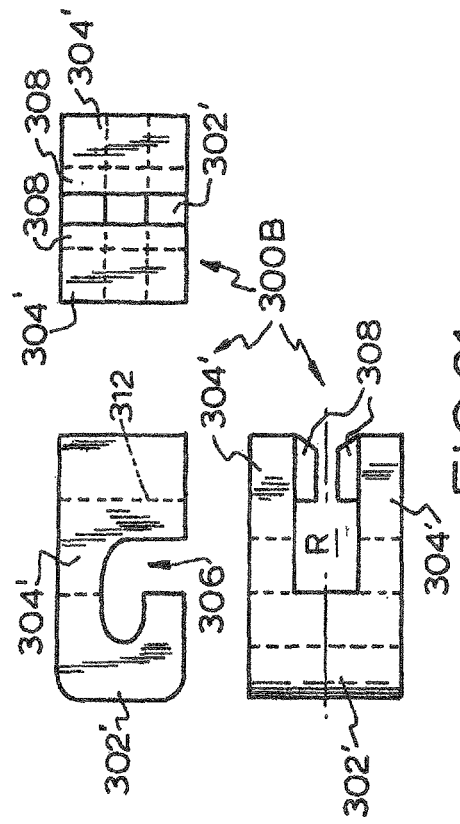
FIGS. 20, 21, 22 and 23 each show, in schematic depiction, side, end and plan views of four respective embodiments of a mounting device for use with the posts of FIGS. 19A to 19B.
Figure 21:
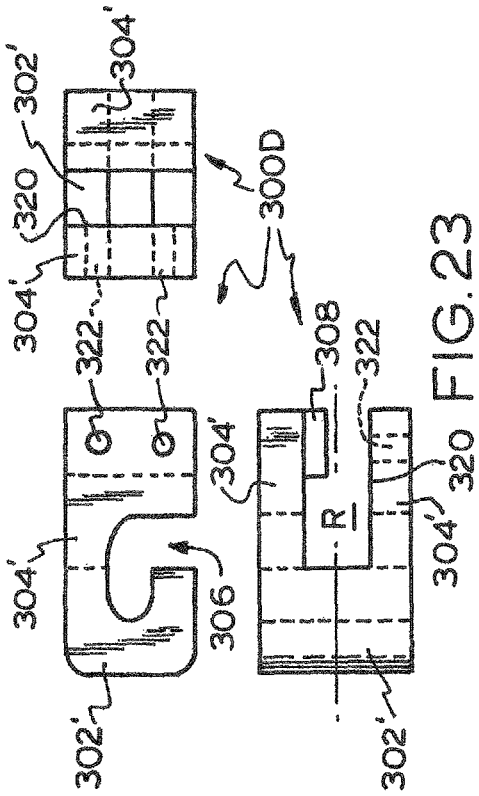
Figure 22:
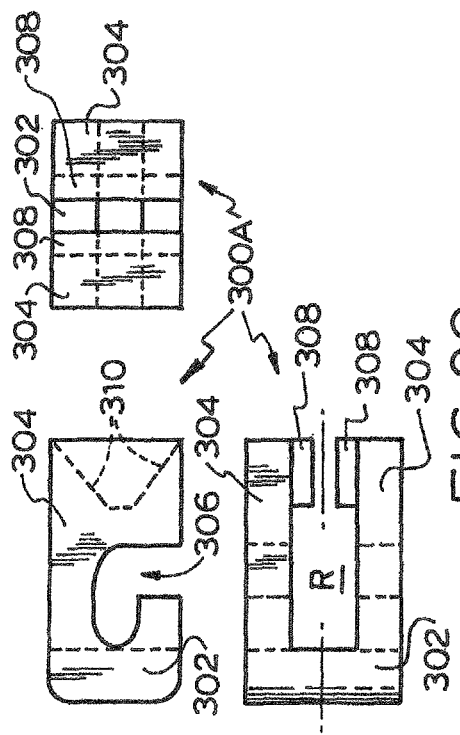
Figure 23:
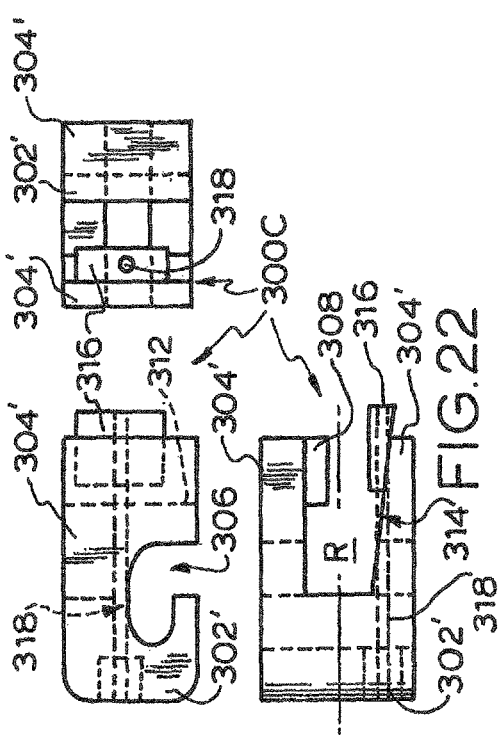

Referring now to FIGS. 20 to 23 four alternative configurations of other mounting devices in the form of clips 300A to 300D are shown. The clip 300A of FIG. 20 is suitable for mounting onto the post 10 of FIG. 19C having the modified distal end section 23'. The clip 300B of FIG. 21, clip 300C of FIG. 22, and clip 300D of FIG. 23 are each suitable for mounting onto the posts 10 of FIGS. 19A and 19D that have the distal end sections 23.

Referring to FIG. 20, the clip 300A comprises a body in the form of a web 302 that has projections in the form of anus 304 extending from opposing ends of the web and that define a recess R therebetween. An inverted L-shaped wire-receiving recess 306 is formed in each arm 304. A head 308 is provided at the inside end of each arm, and has a triangular surface 310 that tapers down back towards, and that faces, the web 302. Each surface 310 is shaped such that it is able to be received in a corresponding V-shaped rebate 25 when the clip 300A is mounted onto the post 10 of FIG. 19C.

In this regard, in use, the clip 300A is slid down the post from an end thereof, with the distal end section 23' being received in the recess R. Once in the desired position, a wire strand is seated in the wire-receiving recess 306, whereby the clip is drawn forward and becomes keyed into the mating profile; i.e. by each surface 310 locating in a corresponding aligned V-shaped rebate 25.

Referring to FIG. 21, the swage-able clip 300B comprises a body in the form of a thicker web 302' that has projections in the form of shorter arms 304' extending from opposing ends of the web and that define a recess R therebetween. The clip 300B is typically formed of a metal that can be swaged (i.e. to swage-mount the clip to the post). Again, an inverted L-shaped wire-receiving recess 306 is formed in each arm 304'. A head 308 is provided at the inside end of each arm, and has a flat surface 312 that faces back to the web 302'.

The flat surface 312 is adapted to closely face an adjacent shoulder of the distal end section 23 when the clip 300B is mounted onto the post 10 of FIGS. 19A & D.

In this regard, in use, the clip 300B is slid down the post from an end thereof, with the distal end section 23 being received in the recess R. Once in the desired position, a wire strand is seated in the wire-receiving recess 306, and the clip is then swaged to the post by a swaging tool (e.g. a pneumatic ram-type tool). When this occurs, the heads 308 are driven against a corresponding face of the stalk 12 to fasten the clip 300B against sliding.

Referring to FIG. 22, the clip 300C comprises a body in the form of a thicker web 302' that has projections in the form of shorter arms 304' extending from opposing ends of the web and that define a recess R therebetween. Again, an inverted L-shaped wire-receiving recess 306 is formed in each arm 304'. A head 308 is provided at the inside end of one arm, and has a flat surface 312 that faces back to the web 302'. Again, the flat surface 312 is adapted to closely face an adjacent shoulder of the distal end section 23 when the clip 300C is mounted onto the post 10 of FIGS. 19A & D.

However, to secure the clip 300C against sliding, the other arm 304' is modified, by providing an inside, recess-facing surface 314 thereon that tapers out, moving away from the web 302'. In addition, a screw-activated wedge 316 is urged to slide across the surface 314. The screw 318 extends from the back of and through the web 302' and through the wedge, and rotation thereof moves the wedge 316 across the surface 314 towards the web 302' and to progressively encroach into the recess R.

In this regard, in use, the clip 300C is slid down the post from an end thereof, with the distal end section 23 being received in the recess R. Once in the desired position, a wire strand is seated in the wire-receiving recess 306, and the screw 318 is then rotated by a suitable tool. When this occurs, the wedge 316 is driven against a corresponding face of the stalk 12 to fasten the clip 300C thereto against sliding.

Referring to FIG. 23, the clip 300D comprises a body in the form of a thicker web 302' that has projections in the form of shorter arms 304' extending from opposing ends of the web and that define a recess R therebetween. Again, an inverted L-shaped wire-receiving recess 306 is formed in each arm 304'. A head 308 is provided at the inside end of one arm, and has a flat surface 312 that faces back to the web 302'. Again, the flat surface 312 is adapted to closely face an adjacent shoulder of the distal end section 23 when the clip 300D is mounted onto the post 10 of FIGS. 19A & D.

However, to secure the clip 300D against sliding, the other arm 304' is modified, by removing the head 308 and providing a flat recess-facing surface 320 thereon. In addition, grub screws 322 extend through the arm 304', adjacent to its distal end.

In this regard, in use, the clip 300D is slid down the post from an end thereof, with the distal end section 23 being received in the recess R. Once in the desired position, a wire strand is seated in the wire-receiving recess 306, and the screws 322 are then rotated by a suitable tool. When this occurs, the screws 322 are driven against a corresponding face of the stalk 12 to fasten the clip thereto against sliding.

It should be understood that the mechanisms which fasten the clip to the post against sliding, as described for the clips of FIGS. 20 to 23, can be adapted for and employed with the previous clips described in each of FIGS. 7 to 18.

Referring now to FIGS. 24A to C a different clip concept is shown to those previously described, with this clip being adapted for use with the post 210 of FIGS. 24D to F. The clip 400 is formed from a plate of spring steel which is bent into shape to define a body in the form of an elongate half-pipe 402, with the projections from the body each taking the form of a plate 404. Together, a spring-loaded clip is defined, whereby the remote ends of the plates are biased towards each other.

Each plate 404 projects from a respective elongate side of the half pipe 402, with a distal edge of each plate being bent out and back to define a round distal edge 406. A transversely extending slot 408 is formed to extend into each plate from its distal edge, the slot having a bell mouth defined at its opening for ease of receiving a wire strand therein.

Tabs 410 are punched to extend in from the sides of each plate, in an alternating and offset manner. Each tab is configured for engaging with a respective alternating indentation 220 formed into the body of the stalk 212 (see FIG. 24C). In this regard, the clip 400 is prised open by a tool (e.g. a circlip-type tool that fits into the distal edges 406), and is then located onto the stalk 212, with the respective tabs being aligned with corresponding indentations 220. The tool then releases the clip, which springs closed to lock onto the stalk. The tabs locate within the indentations, thus the clip resists lateral movement away from the stalk, as well as movement up or down the stalk.

Figure 25:
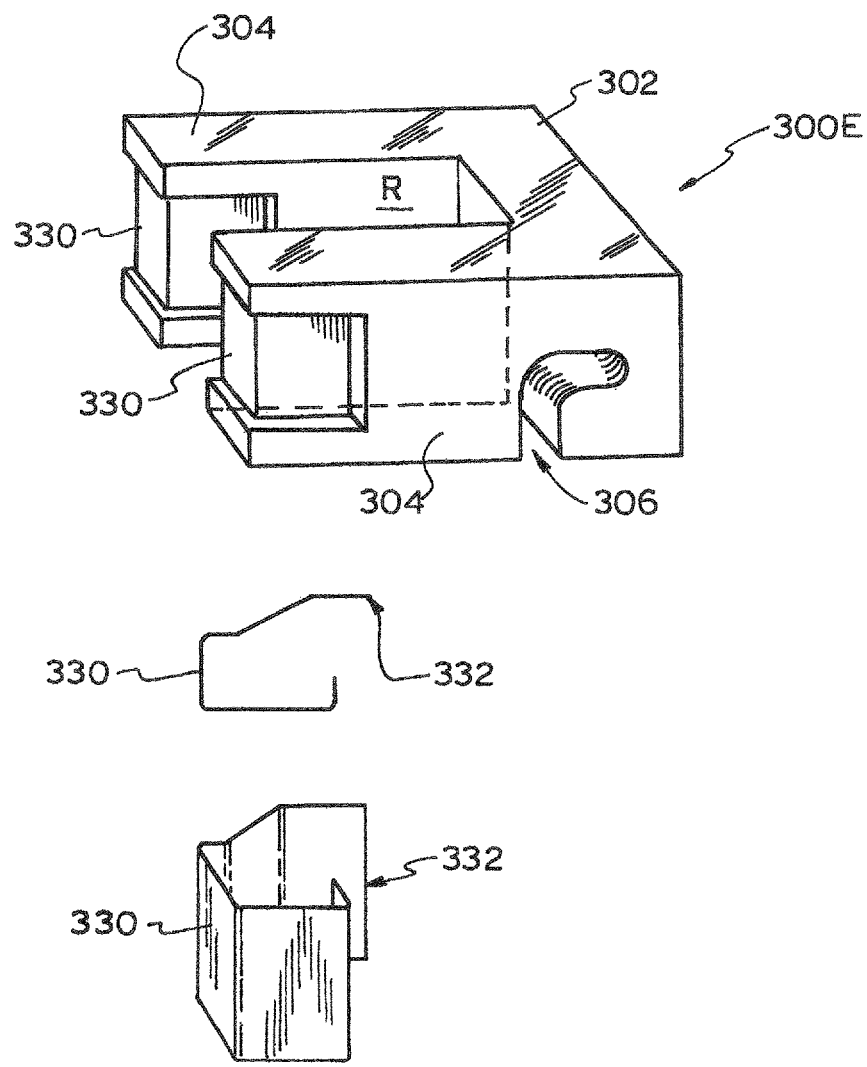
FIG. 25 shows, in schematic depiction, a perspective view of a further embodiment of a mounting device for use with the posts of FIGS. 19A to 19D.

Referring now to FIG. 25 a clip concept 300E is shown which is similar to the clips 300A to 300D, so that like reference numerals are used to denote similar or like parts. However, in this embodiment, the distal ends of arms 304 are modified to enable a respective spring-clip 330 to be affixed thereto.

In use, when located on the distal end of arm 304, each spring clip 330, at its remote edge 332, engages an adjacent shoulder defined at the distal end section 23, once the clip 300E has been slid into position along the post 10 of FIGS. 19A & D. This draws the web 302 into engagement with the external face of the distal end section 23, enabling the clip to resist movement up or down the stalk. Again, the web may be shaped at its inside face for engaging a suitable indentation once in the given position, to further resist movement up or down the stalk.

The clips 300A to 300E may be moulded from plastic (e.g. by injection moulding) or die-cast form a metal alloy, or machined etc.

Other clip configurations for mounting other articles to a post than those illustrated in FIGS. 7 to 25 are able to be developed, with such configurations employing a suitable mounting adaptation to secure the clip to the deformed stalk.

EXAMPLES

Non-limiting Examples of a mounting system will now be described to illustrate how the post and mounting device may be applied.

Example 1

A post 10 for use in agricultural fencing was selected together with a clip 30. In this application, a four-stranded wire fence was required, so four clips/post were employed.

Each post was suitably spaced and was driven ("sunk") into place in the earth with a fence post driver. Each stalk 12 was arranged such that a suitable "facing" of the resultant wires was achieved. The respective locations for each of the wire strands above the ground were noted (e.g. marked) with reference to the notches 24 along the stalk 12.

The four clips 30, each loaded with a strand of wire in the recess 40, were now positioned at these respective locations and clipped (i.e. by push fitting) onto the post, whereby a given protuberance 44 was located into a respective notch. This completed this part of the fencing operation.

It was noted that this operation was considerably faster and simpler than an existing (standard) fencing procedure, and also required no special tools.

Example 2

A post 10 for use in an electric fence was selected together with a clip 50 formed from an insulating plastic. In this application, a two-stranded electric wire fence was required, so three clips/post were employed.

Each post was suitably spaced, sunk and then marked as per Example 1. The two clips 50 were now clipped (i.e. by push fitting) onto the post at these respective locations, whereby a given protuberance 44 was located into a respective notch. Each mounted clip was now loaded with a strand of wire in the recess 56 (i.e. there was no need for wire pre-loading). This completed this part of the fencing operation.

Example 3

A post 10 for use as part of a sign was selected together with a clip 70. In this application, two posts and two clips/post were employed, with one such clip securing an upper side portion of a placard P of the sign, and the other such clip securing a lower side portion of the placard. Three clips/post and three or more posts could be used for larger signs.

Each post was suitably spaced, sunk and then marked as per Example 1. The two clip body parts 72 were now clipped (i.e. by push fitting) onto the post at the respective locations, whereby a given protuberance 44 was located into a respective notch. The placard P was now positioned at the posts, with a hole (e.g. eyelet) at the placard edge being aligned with a respective central aperture 84 of each body part 72. The shank 86 of a retention part 74 was then inserted through the placard hole and into aperture 84. As required, a self-tapping fastener was then introduced through the aperture of shank 86 to secure the part 74 to the placard.

This fastening of the placard was repeated at each body part 72 to complete erection of the sign. This proved to be a very simple and rapid way of erecting the sign (i.e. it was able to be performed by an unskilled person).

Example 4

A post 10 for use as a reflector was selected together with a clip 70. In one such application, one post and one clip/post were employed, with the clip securing the reflector at an upper part of the post. Multiple reflectors/post could also be installed using multiple clips 70 therealong.

The post was sunk and the clip body part 72 was now clipped (i.e. by push fitting) onto the post at a respective upper location, whereby a given protuberance 44 was located into a respective notch. The reflector was now positioned at the post. Three attachment options were employed:

1. The shank 86 of the retention part 74 was inserted into aperture 84. A hole in the centre of the reflector was aligned with the aperture 98 of the body 96. A self-tapping fastener was then introduced through the reflector hole, and through aperture 98 of shank 86 to secure the retention part 74 to the clip body part 72, and thus to secure the reflector to the post.

2. The shank 86 of the retention part 74 was inserted into aperture 84 of the clip body part 72. A self-tapping fastener was then introduced through aperture 98 of shank 86 to secure the part 74 to the clip body part 72. The reflector was then affixed (e.g. by adhesive, double-sided tape etc) to the body 96 to secure the reflector to the post.

3. The reflector was affixed the body 96 of the retention part 74. The shank 86 was then push fitted into aperture 84 of the clip body part 72 to secure the reflector to the post.

These options provided very simple and rapid ways of attaching a reflector to a post (i.e. they were able to be performed by an unskilled person). A similar approach was able to be used to attach a light (e.g. a warning light) to a post.

Example 5

A post 10 for use as part of a barricade was selected together with a clip 100. In this application, multiple posts and one clip/post were employed, with one such clip securing a wide portion of a flexible planar geofabric mesh F therein. Two or more clips/post could be used for wider flexible articles.

Each post was suitably spaced, sunk and then marked as per Example 1. The first and second elongate clip parts 102, 110 were now clipped (i.e. by push fitting) onto the post at respective locations, whereby a given protuberance 44 in each part was located into a respective notch. The channel portion 104 was pivoted into an open position and the geofabric mesh F was then located under the portion 104, adjacent to the distal edge 16. The channel portion 104 was now pivoted into a closed position, locking with the second clip part 110 via end piece 111, and securing (i.e. clamping) the mesh F thereunder against the post distal edge 16.

This fastening of the mesh was repeated at each post to complete erection of a barricade. This proved to be a very simple and rapid way of erecting the barricade (i.e. it was again able to be performed by an unskilled person). Such a barricade was able, inter alia, to function as an earth retaining wall.

Example 6

A post 10 for use as a horizontal support member to support electrical wiring was selected together with a clip 50 formed from an insulating plastic. In this application, a multi-stranded electric wire was required to be supported along the full length of the post, so five (or more) clips were spaced along the post, depending on the length of horizontal post required.

Before locating the post in its final horizontal support location, the clips 50 were clipped (i.e. by push fitting) onto the post at the respective spaced locations, whereby a given protuberance 44 was located into a respective notch. Each mounted clip was now loaded with the multi-stranded electric wire in the recess 56 (i.e. there was no need for wire pre-loading). This completed this part of the operation.

Whilst a number of specific mounting device and system embodiments have been described, it should be appreciated that the device and system may be embodied in other forms.

For example, the mounting device can be moulded or cast with a recess that is suited to whatever shape is formed at the post distal edge.

In a version of the mounting device that is formed from a deformable material (e.g. such as a bendable metal) the device, rather that being pushed on, snap-fitted, or swaged to the post, can be crimped (or otherwise deformed) onto the post, such as by employing a special crimping tool.

The various mounting devices described herein are able to be loaded into a purpose-built "clip" gun. Such a gun can be pneumatically powered and be able to rapidly increase the speed and ease of mounting of the devices to a post.

The mounting device is also able to be employed with posts in horizontal and angled applications (e.g. signs, retaining walls etc).

The inwardly projecting protuberance(s) or shaped surface that align with a given indentation, once the mounting device has been located in position along the distal edge, can take the form or one or more grub screws (or the like). In this regard, once the device is in position, the screw can be advanced from a recessed position and into interfering location with and into the indentation.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the mounting device and system as disclosed herein.

The invention claimed is:

1. A post mounting system comprising a post, a strand, and at least one device for mounting to the post and for retaining the strand at the post:
   the post being of a type that comprises a first elongate flange that defines a stalk of the post, and at least two other elongate projecting flanges that each project from a proximal edge of the stalk, with a portion of the stalk being deformed relative to a remainder of the stalk to facilitate mounting of the device thereto, wherein the deformed portion defines at least one stalk shoulder;
   the device comprising a body and projecting arms extending from opposite sides thereof that defines a first recess therebetween into which the deformed portion of the stalk is able to be received such that, upon being located at a given position along the stalk, the device is able to:
   (i) secure to the stalk against sliding movement along the stalk; and
   (ii) be pushed on to the deformed portion, so that the projecting arms are caused to deflect and flex to snap onto, and interact with, the deformed portion of the stalk such that the projecting arms clamp together to engage the stalk including the at least one stalk shoulder of the deformed portion, without being secured to the other flanges of the post so as to resist lateral movement away from the stalk; and
   wherein the body defines a second recess, the strand received in the second recess so as to be retained at the post when the device is mounted thereto.

2. The system as claimed in claim 1 wherein the deformed portion of the stalk is defined:
   (a) along a distal edge of the first flange, wherein the given position is located along the distal edge, with the deformed portion being defined as an enlargement along the distal edge relative to a remainder of the stalk, and with the device interacting with the enlargement immediately upon being located in the given position to resist lateral movement away from the stalk; and/or
   (b) in sides of the first flange.

3. The system as claimed in claim 2 wherein the enlargement comprises one or more protrusions that extend from and along the distal edge.

4. The system as claimed in claim 3 wherein two protrusions are defined along opposite sides of the distal edge by:
   (i) first and second elongate lugs that project laterally from the stalk at the distal edge wherein, when the stalk is viewed in end profile, each of the first and second elongate lugs has a thickness that is less than the width of the distal edge;
   (ii) a relatively thicker section of the stalk that extends along the distal edge and that defines first and second lateral faces on the protrusions, with the first and second faces being located laterally further from a centerline of the stalk than adjacent faces of a remainder of the stalk and wherein, when the stalk is viewed in end profile, the first and second faces are spaced from each other by a dimension that is less than a depth of the thicker section of the stalk.

5. The system as claimed in claim 4 wherein a plurality of discrete indentations are defined in the enlargement along the distal edge, with a given indentation able to be engaged by a respective device when located at the given position to secure the device against sliding movement along the edge; and wherein in:
   (i) the indentations comprise a series of notches located along one or both sides of the first and second elongate lugs, with each device including at least one protuberance for receipt in a given indentation when the device is located at the given position;
   (ii) shoulders extend between the first and second faces and a remainder of the stalk, and the indentations comprise a series of rebates located along one or both of the shoulders, with the rebates defining a castellated profile along one or both of the shoulders, or the rebates being defined as a series of curved or V-shaped indentations along one or both of the shoulders, with a correspondingly shaped surface being defined within the device that corresponds to and is able to locate in a given rebate.

6. The system as claimed in claim 1 wherein, when the device is located at the given position, and to secure the device against sliding movement along the stalk, the device is adapted in use to engage the stalk via:
   one or more grub screws in the device that can be advanced against the stalk;
   a wedge element in the device that can be moved in the device to act against the stalk.

7. The system as claimed in claim 2 wherein in (b) the deformed portion of the stalk comprises sides of the flange that are indented generally along a centerline of the flange, with the indented direction of adjacent indentations alternating along the length of the stalk, and wherein the projecting arms comprise inward protrusions that are each arranged therealong to locate in a respective indentation to secure the device against sliding movement along the stalk.

8. The system as claimed in claim 1 wherein the stalk is deformed for a substantial part of its length.

9. The system as claimed in claim 2 wherein the post is hot roll-formed, whereby the deformation of the stalk that facilitates mounting of the device thereto is:
   (i) continuously formed during hot roll-forming; or
   (ii) formed as part of a cold-forming procedure that occurs subsequent to the hot roll-forming procedure.

10. The system as claimed in claim 1 wherein each of the post and device is of steel, or a steel alloy, with the device being cast of the steel or alloy.

11. The system as claimed in claim 1 wherein the each of the post and the device is of plastic and each is injection moulded.

12. The system as claimed in claim 1 wherein the device is of plastic and is injection moulded while the post is of plastic and is extruded.

13. The system as claimed in claim 1 wherein the proximal edge of the stalk defines a longitudinal axis of the post, and wherein the two elongate flanges project from and along the length of the stalk proximal edge so as to define the post with either a Y-shaped or T-shaped profile.

14. A post mounting system comprising one or more posts, a plurality of strands, and a plurality of devices for mounting in a spaced manner along a given post of the one or more posts, wherein for each post, strand and device:

the post being of a type that comprises a first elongate flange that defines a stalk of the post, and at least two other elongate projecting flanges that each project from a proximal edge of the stalk, with a portion of the stalk being deformed relative to a remainder of the stalk to facilitate mounting of the device thereto;

the device comprising a body and projecting arms extending from opposite sides thereof such that, upon being located at a given position along the stalk, the device is able to:

(i) secure to the stalk against sliding movement along the stalk; and (ii) be pushed on to the deformed portion, so that the projecting arms are caused to deflect and flex to snap onto, and interact with, the deformed portion of the stalk, without being secured to the other flanges of the post so as to resist lateral movement away from the stalk; and wherein the body defines a recess, one of a plurality of strands received in the recess so as to be retained at the post when the device is mounted thereto.

* * * * *